United States Patent
Onuma

(10) Patent No.: US 11,558,122 B2
(45) Date of Patent: Jan. 17, 2023

(54) OPTICAL TRANSMISSION APPARATUS, TERMINAL STATION APPARATUS, OPTICAL COMMUNICATION SYSTEM, AND OPTICAL COMMUNICATION METHOD

(71) Applicant: NEC Corporation, Tokyo (JP)

(72) Inventor: Taketo Onuma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/423,375

(22) PCT Filed: Dec. 6, 2019

(86) PCT No.: PCT/JP2019/047896
§ 371 (c)(1),
(2) Date: Jul. 15, 2021

(87) PCT Pub. No.: WO2020/158190
PCT Pub. Date: Aug. 6, 2020

(65) Prior Publication Data
US 2022/0131618 A1    Apr. 28, 2022

(30) Foreign Application Priority Data
Jan. 31, 2019 (JP) .............. JP2019-016416

(51) Int. Cl.
*H04J 14/02* (2006.01)
*H04B 10/572* (2013.01)

(52) U.S. Cl.
CPC ........ *H04B 10/572* (2013.01); *H04J 14/0227* (2013.01); *H04J 14/0221* (2013.01)

(58) Field of Classification Search
None
See application file for complete search history.

(56) References Cited

U.S. PATENT DOCUMENTS 6,259,553 B1 * 7/2001 Kinoshita ............ H04B 10/296
359/337.13
7,660,529 B2 * 2/2010 Wei ..................... H04J 14/0246
398/95
(Continued)

FOREIGN PATENT DOCUMENTS

JP   2005-051598 A   2/2005
JP   2014-187671 A   10/2014
(Continued)

OTHER PUBLICATIONS

Extended European Search Report for EP Application No. EP19913946.0 dated Mar. 2, 2022.
(Continued)

*Primary Examiner* — Jai M Lee
(74) *Attorney, Agent, or Firm* — Sughrue Mion, PLLC

(57) ABSTRACT

An object is to provide an optical transmission apparatus in which dummy lights can be arranged according to an arrangement of optical signals. A plurality of optical signals of different frequencies arranged in a frequency grid are input to a multiplexing unit and the multiplexing unit multiplexes the input optical signals. A dummy light output unit identifies a dummy light to be arranged in the frequency grid based on the plurality of optical signals and outputs the dummy light. A multiplexing unit multiplexes an optical signal multiplexed by the multiplexing unit and the dummy light output from the dummy light output unit to output a wavelength-multiplexed optical signal L.

17 Claims, 21 Drawing Sheets

(56) References Cited

U.S. PATENT DOCUMENTS

| | | | | |
|---|---|---|---|---|
| 8,822,895 | B2* | 9/2014 | Abedin | H04B 10/079 |
| | | | | 356/73.1 |
| 9,136,970 | B2* | 9/2015 | Wellbrock | H04J 14/0212 |
| 9,219,565 | B2* | 12/2015 | Kaneko | H04B 10/506 |
| 10,230,483 | B2 | 3/2019 | Inada | H04B 10/501 |
| 10,298,317 | B2* | 5/2019 | Mertz | H04J 14/0212 |
| 10,680,738 | B2* | 6/2020 | Inoue | H04J 14/0267 |
| 10,735,091 | B2* | 8/2020 | Inoue | H04J 14/02 |
| 2003/0048508 | A1* | 3/2003 | Yu | H04J 14/0297 |
| | | | | 398/91 |
| 2005/0024715 | A1* | 2/2005 | Inoue | H04J 14/0221 |
| | | | | 359/337 |
| 2008/0304829 | A1* | 12/2008 | Sato | H04J 14/0221 |
| | | | | 398/79 |
| 2009/0129770 | A1* | 5/2009 | Oohashi | H04J 14/0294 |
| | | | | 398/1 |
| 2013/0004166 | A1 | 1/2013 | Okada | |
| 2014/0233945 | A1* | 8/2014 | Jeong | H04B 10/564 |
| | | | | 398/34 |
| 2014/0286635 | A1 | 9/2014 | Kaneko et al. | |
| 2015/0132009 | A1 | 5/2015 | Yuki et al. | |
| 2018/0034544 | A1 | 2/2018 | Satou | |
| 2018/0069648 | A1 | 3/2018 | Inada | |
| 2018/0269964 | A1 | 9/2018 | Mertz et al. | |
| 2018/0351640 | A1* | 12/2018 | Satou | H04B 10/07955 |

FOREIGN PATENT DOCUMENTS

| | | |
|---|---|---|
| JP | 2015-095808 A | 5/2015 |
| JP | 2018-157362 A | 10/2018 |
| WO | 2011/161929 A1 | 12/2011 |
| WO | 2016/139933 A1 | 9/2016 |
| WO | WO-2016139933 A1 * 9/2016 | ........... H04B 10/075 |
| WO | 2018/180611 A1 | 10/2018 |

OTHER PUBLICATIONS

International Search Report for PCT Application No. PCT/JP2019/047896, dated Jan. 28, 2020.

* cited by examiner

OPTICAL TRANSMISSION APPARATUS, TERMINAL STATION APPARATUS, OPTICAL COMMUNICATION SYSTEM, AND OPTICAL COMMUNICATION METHOD

This application is a National Stage Entry of PCT/JP2019/047896 filed on Dec. 6, 2019, which claims priority from Japanese Patent Application 2019-016416 filed on Jan. 31, 2019, the contents of all of which are incorporated herein by reference, in their entirety.

TECHNICAL FIELD

The present invention relates to an optical transmission apparatus, a terminal station apparatus, an optical communication system, and an optical communication method.

BACKGROUND ART

In a submarine optical cable system, an optical transmission apparatus disposed at a land terminal station transmits a wavelength-multiplexed optical signal through a submarine optical cable. To compensate for optical loss due to transmission through the submarine optical cable, a plurality of optical amplifiers are generally inserted into the submarine optical cable.

A wavelength-multiplexed optical signal output from a transmission-side terminal station includes an optical signal (Main signal) in which data addressed to a reception terminal station is superimposed and dummy light inserted to compensate for an intensity of the wavelength-multiplexed optical signal according to presence or absence of the optical signal. An intensity of the dummy light is controlled according to the presence or absence of the optical signal. When an optical signal is added to the wavelength-multiplexed optical signal, the intensity of the dummy light is controlled to decrease according to the intensity of the optical signal to be added. When the dummy light is arranged at a wavelength overlapping that of the optical signal to be added, the dummy light is controlled to be blocked.

As a method for controlling the dummy light, an optical transmission apparatus that uses a single wideband (bandwidth) dummy light or a plurality of narrowband (channel width) dummy lights for each subband (Patent Literature 1). In this optical transmission apparatus, when a new optical signal is inserted into the subband in which a plurality of narrowband dummy lights are used, an intensity of a wavelength-multiplexed optical signal is maintained constant by adjusting intensities of the dummy lights in the subband.

CITATION LIST

Patent Literature

[Patent Literature 1] Japanese unexamined patent application publication No. 2014-187671

SUMMARY OF INVENTION

Technical Problem

When controlling the dummy light, it is desirable to determine a frequency of the dummy light according to an arrangement of the optical signals, that is, a frequency distribution. However, in recent years, it has been required to arbitrarily set the arrangement of the optical signals after starting an operation of a system. That is, when the arrangement of the optical signals is changed by adding or removing an optical signal after the operation of the system has been started, a method for arranging the dummy light is required.

However, in Patent Literature 1, it is not assumed that the dummy light is arranged according to the change in the arrangement of the optical signals after the operation has been started.

An object of the present invention is to provide an optical transmission apparatus in which dummy lights can be arranged according to the arrangement of optical signals.

Solution to Problem

An aspect of the present invention is an optical transmission apparatus including: a first multiplexing unit, a plurality of optical signals of different frequencies arranged in a frequency grid being input to the first multiplexing unit, the first multiplexing unit being configured to multiplex the input optical signals; a dummy light output unit configured to identify one or more dummy lights to be arranged in the frequency grid based on the plurality of optical signals and output the identified one or more dummy lights; and a second multiplexing unit configured to multiplex the plurality of optical signals multiplexed by the first multiplexing unit and the one or more dummy lights output from the dummy light output unit to output a wavelength-multiplexed optical signal.

An aspect of the present invention is a terminal station apparatus including: one or more optical transceivers; and an optical transmission apparatus in which a plurality of optical signals of different wavelengths are input from the one or more optical transceivers, in which the optical transmission apparatus includes: a first multiplexing unit, a plurality of optical signals of different frequencies arranged in a frequency grid being input to the first multiplexing unit, the first multiplexing unit being configured to multiplex the input optical signals; a dummy light output unit configured to identify one or more dummy lights to be arranged in the frequency grid based on the plurality of optical signals and output the identified one or more dummy lights; and a second multiplexing unit configured to multiplex the plurality of optical signals multiplexed by the first multiplexing unit and the one or more dummy lights output from the dummy light output unit to output a wavelength-multiplexed optical signal.

An aspect of the present invention is an optical communication system including: a first terminal station configured to output a wavelength-multiplexed optical signal; and a second terminal station configured to receive the wavelength-multiplexed optical signal, in which the first terminal station includes: one or more optical transceivers; and an optical transmission apparatus in which a plurality of optical signals of different wavelengths are input from the one or more optical transceivers, in which the optical transmission apparatus includes: a first multiplexing unit, a plurality of optical signals of different frequencies arranged in a frequency grid being input to the first multiplexing unit, the first multiplexing unit being configured to multiplex the input optical signals; a dummy light output unit configured to identify one or more dummy lights to be arranged in the frequency grid based on the plurality of optical signals and output the identified one or more dummy lights; and a second multiplexing unit configured to multiplex the plurality of optical signals multiplexed by the first multiplexing unit and the one or more dummy lights output from the dummy light output unit to output a wavelength-multiplexed optical signal.

An aspect of the present invention is an optical communication method including: multiplexing a plurality of optical signals of different frequencies arranged in a frequency grid; identifying one or more dummy lights to be arranged in the frequency grid based on the plurality of optical signals and outputting the one or more identified dummy lights; and multiplexing the plurality of multiplexed optical signals and the one or more dummy lights to output a wavelength-multiplexed optical signal.

Advantageous Effects of Invention

According to the present invention, it is possible to provide an optical transmission apparatus in which dummy lights can be arranged according to an arrangement of optical signals.

DESCRIPTION OF EMBODIMENTS

Example embodiments of the present invention will be described hereinafter with reference to the drawings. In the description of the drawings the same elements will be denoted by the same reference symbols and redundant description will be omitted as appropriate.

First Example Embodiment

Figure 1:
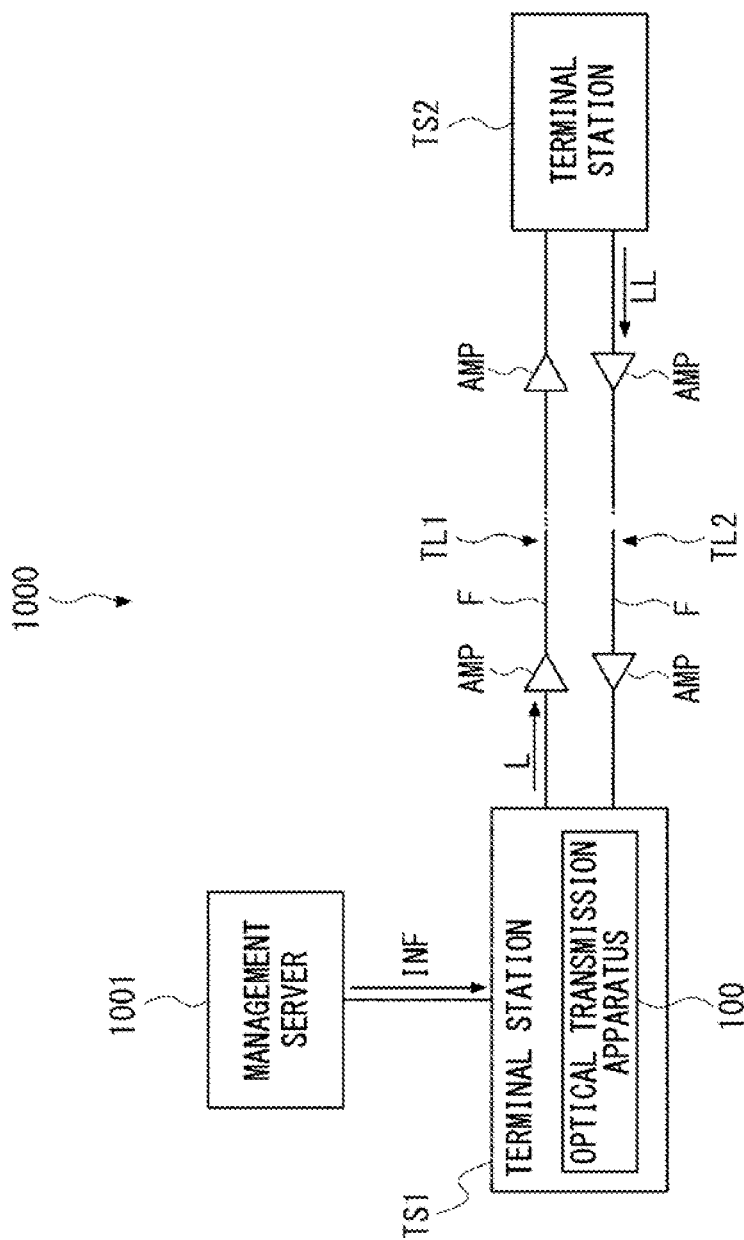
FIG. 1 is a diagram showing a basic configuration of an optical communication system including an optical transmission apparatus according to a first example embodiment.

An optical transmission apparatus 100 according to a first example embodiment will be described. FIG. 1 shows a basic configuration of an optical communication system 1000 including the optical transmission apparatus 100 according to the first example embodiment. Here, the optical transmission apparatus 100 is assumed to be installed at a terminal station on land included in the optical communication system 1000 constituting a submarine optical network.

FIG. 1 schematically shows a configuration example of the optical communication system 1000 according to the first example embodiment. In this example, the optical communication system 1000 includes terminal stations TS1 and TS2, an optical amplifier AMP, an optical fiber F, and a management server 1001. The terminal stations TS1 and TS2 are terminal stations installed on land. The terminal station TS1 includes the optical transmission apparatus 100.

The management server 1001 is configured to be capable of controlling operations of the terminal station TS1 and the optical transmission apparatus 100 by providing a notification signal INF.

The terminal station TS1 and the terminal station TS2 are connected by a transmission line that is disposed on land or on the seabed and includes an optical fiber F for transmitting optical signals. Here, a transmission line for transmitting optical signals from the terminal station TS1 (first terminal station) to the terminal station TS2 (second terminal station) is defined as a transmission line TL1. A transmission line for transmitting optical signals from the terminal station TS2 to the terminal station TS1 is defined as a transmission line TL2. Note that other apparatuses such as a submarine optical branching apparatus for ADD/DROP optical signals may be inserted into the transmission lines TL1 and TL2 as necessary.

One or more optical amplifiers AMP for amplifying optical signals are inserted into each of the transmission lines TL1 and TL2.

In the present example embodiment, the terminal station TS1 outputs a wavelength-multiplexed optical signal L (first wavelength-multiplexed optical signal) to the terminal station TS2 through the transmission line TL1. In the wavelength-multiplexed optical signal L, optical signals of one or more wavelengths (channel) to be transmitted are wavelength-multiplexed. The terminal station TS2 outputs a wavelength-multiplexed optical signal LL (second wavelength-multiplexed optical signal) to the terminal station TS1 through the transmission line TL2.

Next, a configuration of the terminal station TS1 according to the present example embodiment will be described.

The terminal station TS1 has an optical transmission apparatus and a plurality of optical transponders, similar to a general terminal station.

Figure 2:
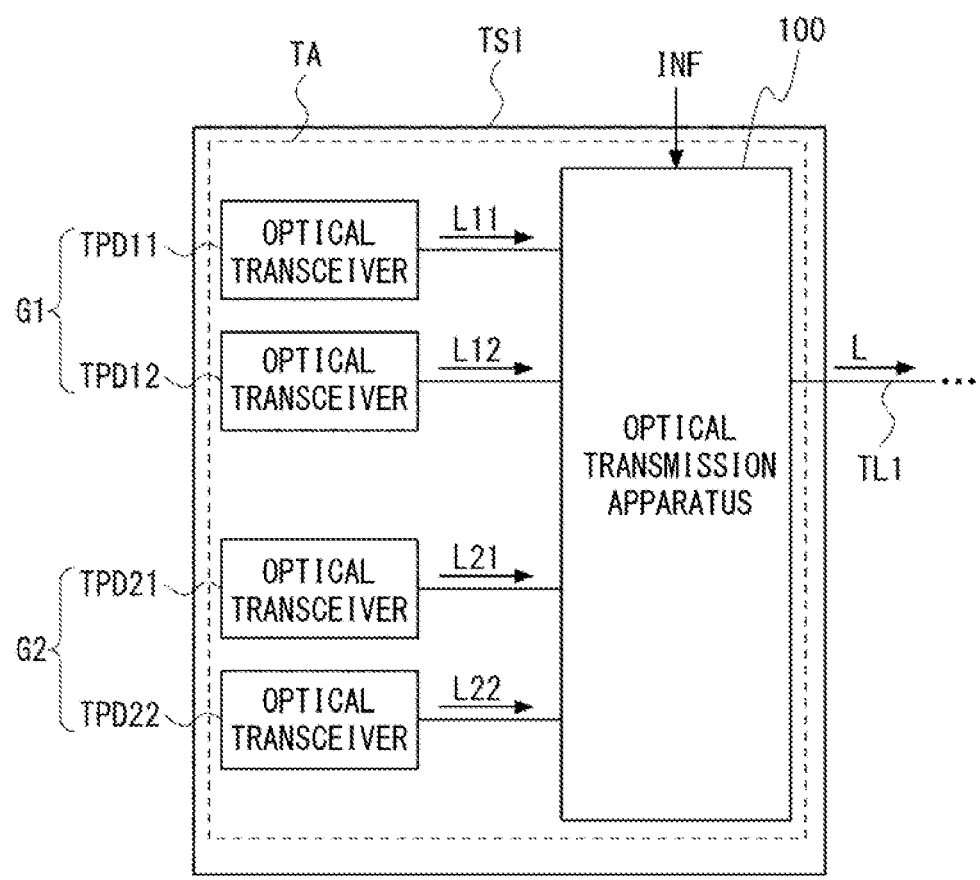
FIG. 2 is a diagram schematically showing a configuration of a terminal station according to the first example embodiment.

FIG. 2 schematically shows the configuration of the terminal station TS1 according to the first example embodiment. FIG. 2 shows an example in which optical transceivers TPD11, TPD12, TPD21, and TPD22 are connected to the optical transmission apparatus 100 disposed in the terminal station TS1. In the present configuration, the optical transmission apparatus 100 and the optical transceivers TPD11, TPD12, TPD21, and TPD22 constitute a terminal station apparatus TA disposed in the terminal station TS1.

The optical transceivers TPD11, TPD12, TPD21, and TPD22 are connected to the optical transmission apparatus 100 by, for example, an optical fiber, and can exchange optical signals with other terminal stations via the optical transmission apparatus 100. A plurality of optical transceivers disposed in a terminal station need not be the same optical transceiver, and optical transceivers having different functions or optical transceivers of different vendors can be used as appropriate.

In this example, the optical transceivers TPD11, TPD12, TPD21, and TPD22 output the optical signals L11, L12, L21, and L22 to the optical transmission apparatus 100, respectively. Each of the optical signals L11, L12, L21, and L22 includes an optical signal having a frequency of 1 or more.

The optical transmission apparatus 100 multiplexes optical signals L11, L12, L21 and L22, and further multiplexes dummy light into the multiplexed optical signal to generate a wavelength-multiplexed optical signal L. The optical transmission 100 apparatus 100 outputs the wavelength-multiplexed optical signal L to the transmission line TL1.

In this configuration, optical transceivers TPD11 and TPD12 correspond to a frequency grid G1 included in the wavelength-multiplexed optical signal L, and optical transceivers TPD21 and TPD22 correspond to a frequency grid G2. Thus, the optical signals L11 and L12 are optical signals corresponding to the frequency grid G1, and the optical signals L21 and L22 are optical signals corresponding to the frequency grid G2. The frequency grid will be described later in detail.

The frequency grids G1 and G2 can be assigned to different users. In this case, each user can insert or remove optical signals as needed within the assigned frequency grid.

Here, the optical signals and dummy lights included in the wavelength-multiplexed optical signal L will be specifically described. In general, a plurality of frequency grids are set in the wavelength-multiplexed optical signal L. Here, the frequency grid means a group of center frequencies that can be used as channels of optical signals, as specified in ITU-T G 694.1.

Here, for the purpose of clarification of the description, "Bandwidth" indicates a width of a frequency band or a wavelength band between a lower limit value and an upper limit value, and "Band" indicates a frequency range or a wavelength range having a predetermined "Bandwidth" centered on a predetermined center wavelength or a "Bandwidth" between the upper limit value and the lower limit value. In other words, "Bandwidth" can be quantitatively defined by numerical values, and "Bandwidth" is used to identify a frequency range or a wavelength range having a predetermined "Bandwidth" set at different positions, for example, a first band or a second band.

Figure 3:
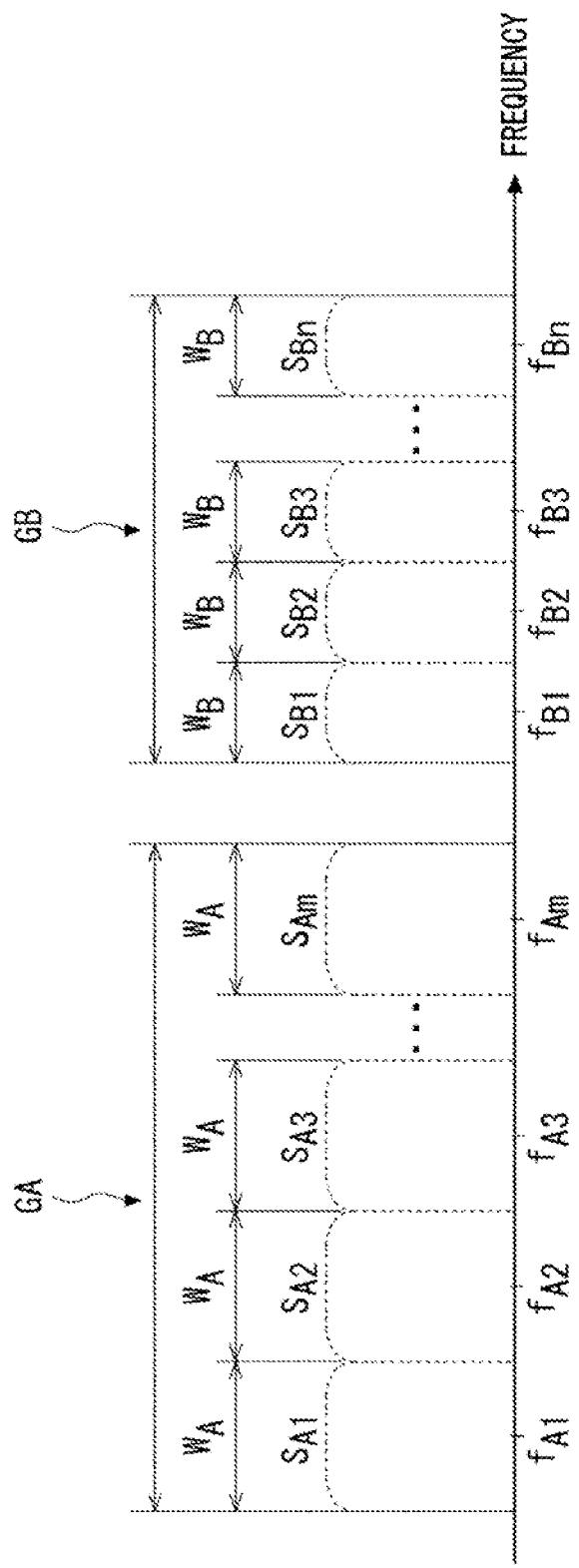
FIG. 3 is a diagram showing an example of a frequency grid.

FIG. 3 shows an example of a frequency grid. In FIG. 3, a frequency grid GA and a frequency grid GB on a higher frequency side than the frequency grid GA are shown as examples. In this example, although there is a gap between the frequency grid GA and the frequency grid GB to make the drawing easier to see, it should be appreciated that the frequency grid GA and the frequency grid GB may be in contact with each other. For example, when there is a band which does not belong to either of the frequency grid GA and the frequency grid GB, a guard band may be arranged in the band.

The frequency grid GA includes m (m is a positive integer) center frequencies $f_{A1}$ to $f_{Am}$ that can be used as channels of optical signals. In the frequency grid GA, frequency slots $S_{A1}$ to $S_{Am}$ of a bandwidth $W_A$ respectively centered on center frequencies $f_{A1}$ to $f_{Am}$ are provided. The frequency grid GB includes n (n is a positive integer) center frequencies $f_{B1}$ through $f_{Bn}$ that can be used as channels of optical signals. In the frequency grid GB, frequency slots $S_{B1}$ to $S_{Bn}$ of a bandwidth $W_B$ respectively centered on center frequencies $f_{B1}$ to $f_{Bn}$ are provided. As specified in ITU-T G 694.1, the frequency slots are provided so that there are no overlapping bands (frequency ranges). Hereinafter, the bandwidth of the frequency slot is referred to as a slot width.

The slot width $W_A$ of the frequency slots $S_{A1}$ to $S_{AM}$ and the slot width $W_B$ of the frequency slots $S_{B1}$ to $S_{Bn}$ may be the same or different. For example, the slot width $W_A$ and the slot width $W_B$ may be the same 50 GHz, or the slot width $W_A$ may be 50 GHz and the slot width $W_B$ may be 37.5 GHz.

Figure 4:
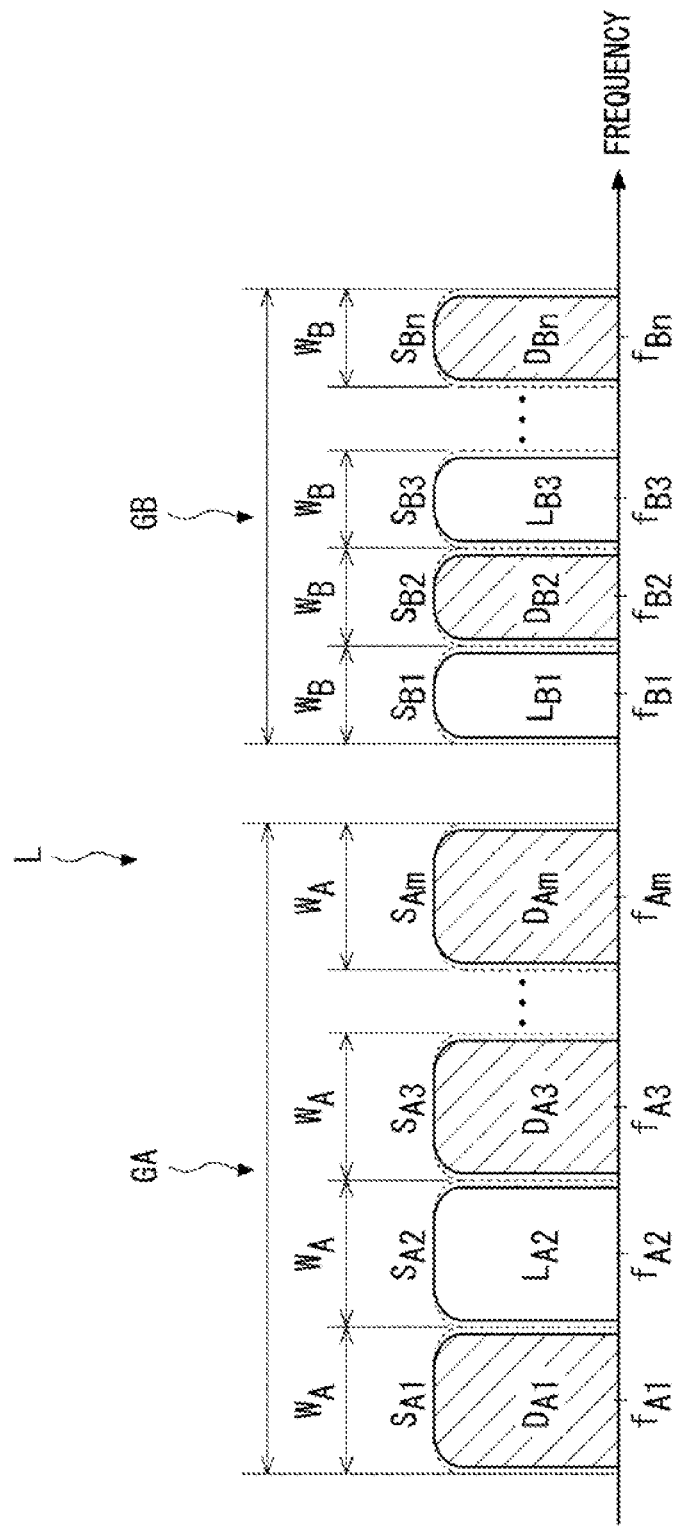
FIG. 4 is a diagram showing an example of optical signals and dummy lights arranged in the frequency grid.

Next, optical signals and dummy lights arranged in the frequency grid will be described. FIG. 4 shows an example of optical signals and dummy lights arranged in the frequency grid shown in FIG. 3. In this example, one optical signal or one dummy light is disposed in one frequency slot, and the optical signal and the dummy light disposed in the same frequency slot have the same bandwidth.

In this example, in the frequency grid GA, the optical signal $L_{A2}$ is arranged in the frequency slot $S_{A2}$, and dummy lights $D_{A1}$, $D_{A3}$, and $D_{AM}$ are arranged in the frequency slots $S_{A1}$, $S_{A3}$, and $S_{AM}$. Although display of the frequency slots $S_{A4}$ to $S_{A(m-1)}$ is omitted, an optical signal or dummy light is also arranged in each of these slots.

In the frequency grid GB, optical signals $L_{B1}$ and $L_{B3}$ are arranged in the frequency slots $S_{B1}$ and $S_{B3}$, and dummy lights $D_{B2}$ and $D_{Bn}$ are arranged in the frequency slots $S_{B2}$ and $S_{Bn}$. Although the display of the frequency slots $S_{B4}$ to $S_{B(n-1)}$ is omitted, an optical signal or dummy light is also arranged in each of these slots.

The arrangement of the optical signals and the dummy lights shown in FIG. 4 is merely an example, and it should be appreciated that the number of optical signals, the number of dummy lights, the arrangement of the optical signals and the dummy lights can be appropriately changed as appropriate.

Figure 5:
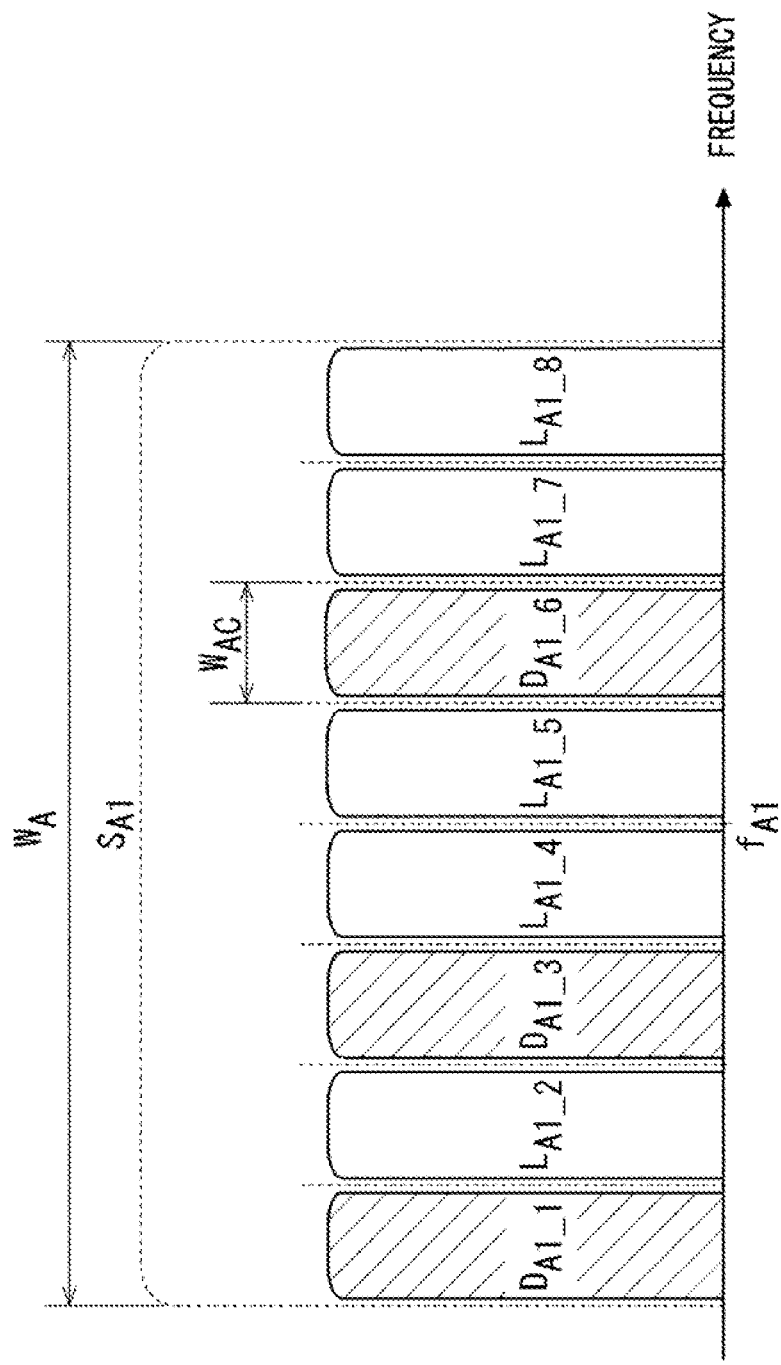
FIG. 5 is a diagram showing an example of arranging a plurality of optical signals and a plurality of dummy lights in one frequency slot.

Although the example in which one optical signal or one dummy light is arranged in one frequency slot has been described here, a plurality of optical signals and a plurality of dummy lights may be arranged. FIG. 5 shows an example in which a plurality of optical signals and a plurality of dummy lights are arranged in one frequency slot $S_{A1}$. In the frequency slot $S_{A1}$, for example, eight channels are set from the low-frequency side. In this case, a bandwidth of each channel is $W_{AC}$.

Dummy lights $D_{A1\_1}$, $D_{A1\_3}$, and $D_{A1\_6}$ are arranged in a first, third, and sixth channels, respectively. Optical signals $L_{A1\_2}$, $L_{A1\_4}$, $L_{A1\_5}$, $L_{A1\_7}$, and $L_{A1\_8}$ are arranged in a second, fourth, fifth, seventh, and eighth channels, respectively. In this way, a plurality of channels can be set in one frequency slot, and an optical signal or a dummy light can be arranged in each channel as appropriate.

Figure 6:
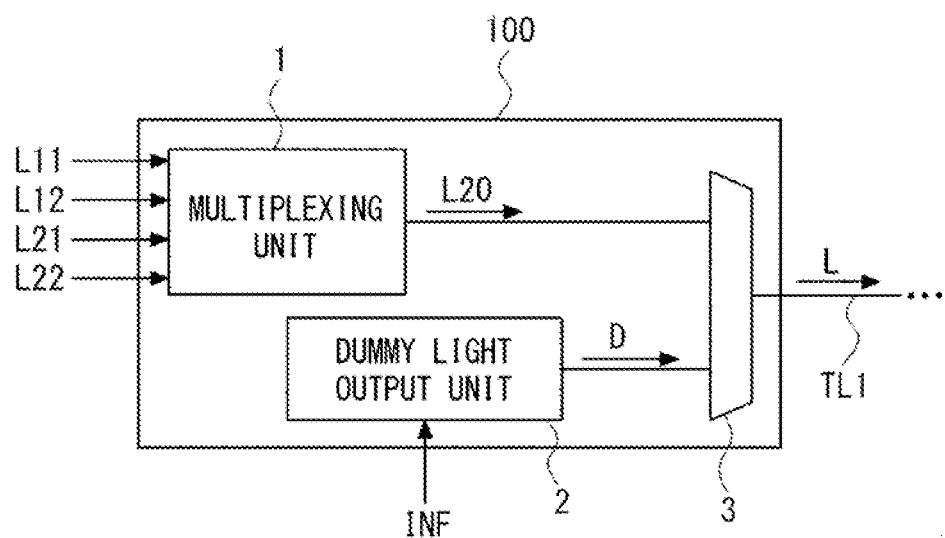
FIG. 6 is a diagram schematically showing a configuration of an optical transmission apparatus according to the first example embodiment.
Figure 7:
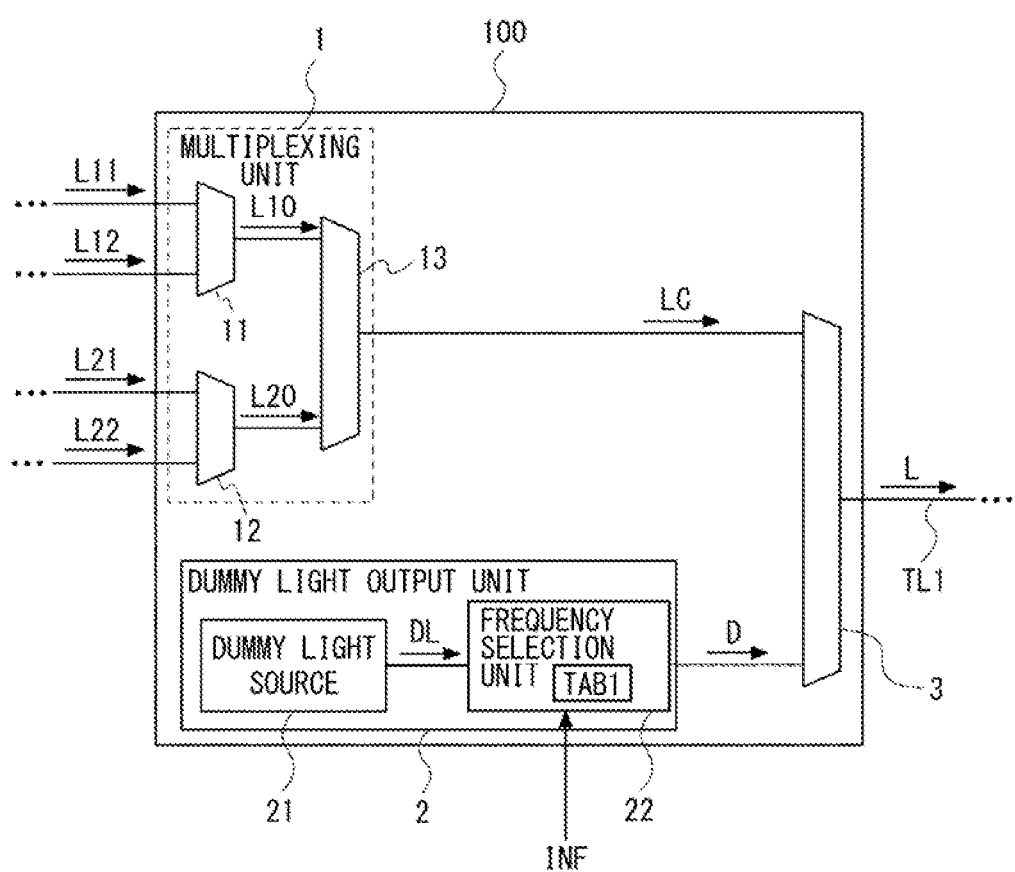
FIG. 7 is a diagram showing the configuration of the optical transmission apparatus according to the first example embodiment in more detail.

Next, the optical transmission apparatus 100 according to the first example embodiment will be described. FIG. 6 schematically shows a configuration of the optical transmission apparatus 100 according to the first example embodiment. FIG. 7 shows the configuration of the optical transmission apparatus 100 according to the first example embodiment in more detail. The optical transmission apparatus 100 includes a multiplexing unit 1, a dummy light output unit 2, and a multiplexing unit 3. The Optical signals L11, L12, L21, and L22 are input to the optical transmission apparatus 100.

The multiplexing unit 1 (first multiplexing unit) includes multiplexers 11 to 13. The multiplexers 11 to 13 are configured, for example, as a wavelength selective switch (WSS).

The multiplexer 11 multiplexes the optical signals L11 and L12 corresponding to the frequency grid G1, and outputs a multiplexed optical signal L10 to the multiplexer 13.

The multiplexer 12 multiplexes the optical signals L21 and L22 corresponding to the frequency grid G2, and outputs a multiplexed optical signal L20 to the multiplexer 13.

The multiplexer 13 multiplexes the optical signal L10 and the optical signal L20, and outputs a multiplexed optical signal LC to the multiplexing unit 3.

The dummy light output unit 2 includes a dummy light source 21 and a frequency selection unit 22. The dummy light source 21 outputs a light DL in a predetermined frequency range. The frequency selection unit 22 selects lights of a plurality of bands to be output as dummy lights from the light of the predetermined frequency range, and outputs the selected lights as dummy lights. For example, the frequency selection unit 22 may be configured as a wavelength selective switch (WSS). In FIGS. 6 and 7, the dummy lights output from the dummy light output unit 2 are collectively indicated by a reference sign D.

The multiplexing unit 3 (second multiplexing unit) multiplexes the optical signal LC and the dummy light D and outputs the wavelength-multiplexed optical signal L to the transmission line TL1. The multiplexing unit 3 is configured, for example, as an optical coupler.

Next, an operation of the optical transmission apparatus 100 will be described. The following description will be based on the frequency grids described with reference to FIG. 4.

Therefore, for example, the optical signal $L_{A2}$ of FIG. 4 may correspond to any of the optical signals L11 and L12 described with reference to FIGS. 2, 6, 7, or the like. For example, the optical signals $L_{B1}$ and $L_{B3}$ in FIG. 4 may correspond to any of the optical signals L21 and L22 described with reference to FIGS. 2, 6, 7, or the like.

Figure 8:
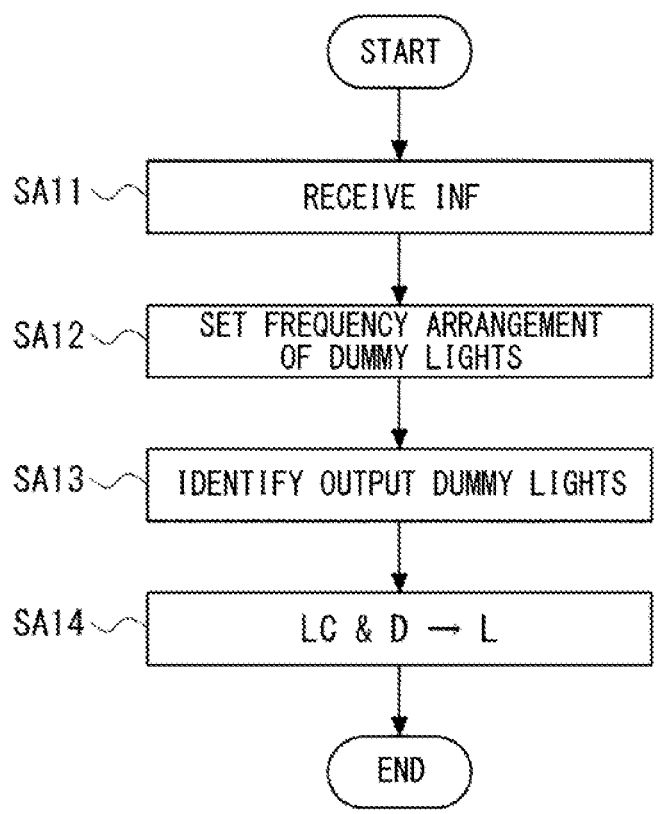
FIG. 8 is a flowchart showing an operation of the optical transmission apparatus according to the first example embodiment.

FIG. 8 is a flowchart showing the operation of the optical transmission apparatus 100 according to the first example embodiment. The management server 1001 outputs the notification signal INF for notifying the optical transmission apparatus 100 of the optical signal included in each frequency grid. The notification signal INF includes, for example, information indicating the center frequency of the optical signal.

The notification signal INF may include information indicating a wavelength grid, for example, information indicating a center frequency constituting the wavelength grid, information on a bandwidth of a slot constituting the wavelength grid, and a part or all of a band in which the wavelength grid is provided.

The management server 1001 can receive information indicating the center frequency and wavelength grid of the optical signal from the outside and store it therein, and may generate the notification signal INF based on the stored information. If the management server 1001 can read setting information (output wavelength) of the optical transceiver, the notification signal INF may be generated based on the read setting information. Further, if the management server 1001 can input (write, update, or change) the setting information to the optical transceiver, the notification signal INF may be generated based on the input setting information.

Figure 9:
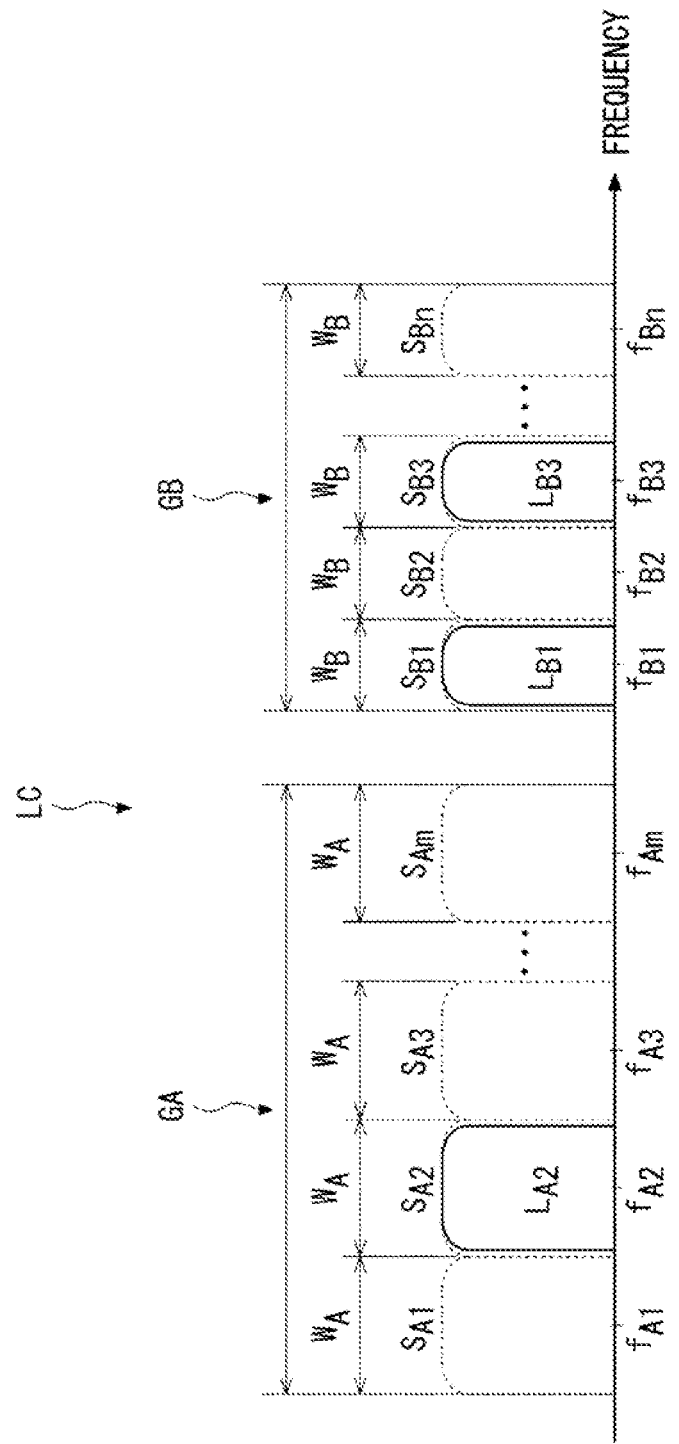
FIG. 9 is a diagram showing an arrangement of optical signals included in a wavelength-multiplexed optical signal.

FIG. 9 shows an arrangement of optical signals included in the wavelength-multiplexed optical signal L. That is, FIG. 9 shows a frequency distribution of the optical signal LC output from the multiplexing unit 1.

Step SA11

The frequency selection unit 22 receives the notification signal INF.

Step SA12

The frequency selection unit 22 refers to a table TAB1 stored based on the notification signal INF, and sets a frequency to be selectively output from the light DL from the dummy light source 21. Here, the frequency selectively output from the light DL corresponds to the center frequency or the frequency grid of the optical signal included in the wavelength-multiplexed optical signal L. The table TAB1 may store the center frequency and the bandwidth of the dummy light to be output according to the center frequency and the frequency grid of the optical signal.

If the notification signal INF directly instructs the frequency to be selectively output from the light DL to the frequency selection unit 22, the table TAB1 need not be stored and the frequency to be selectively output from the light DL may be set based on the notification signal INF.

Figure 10:
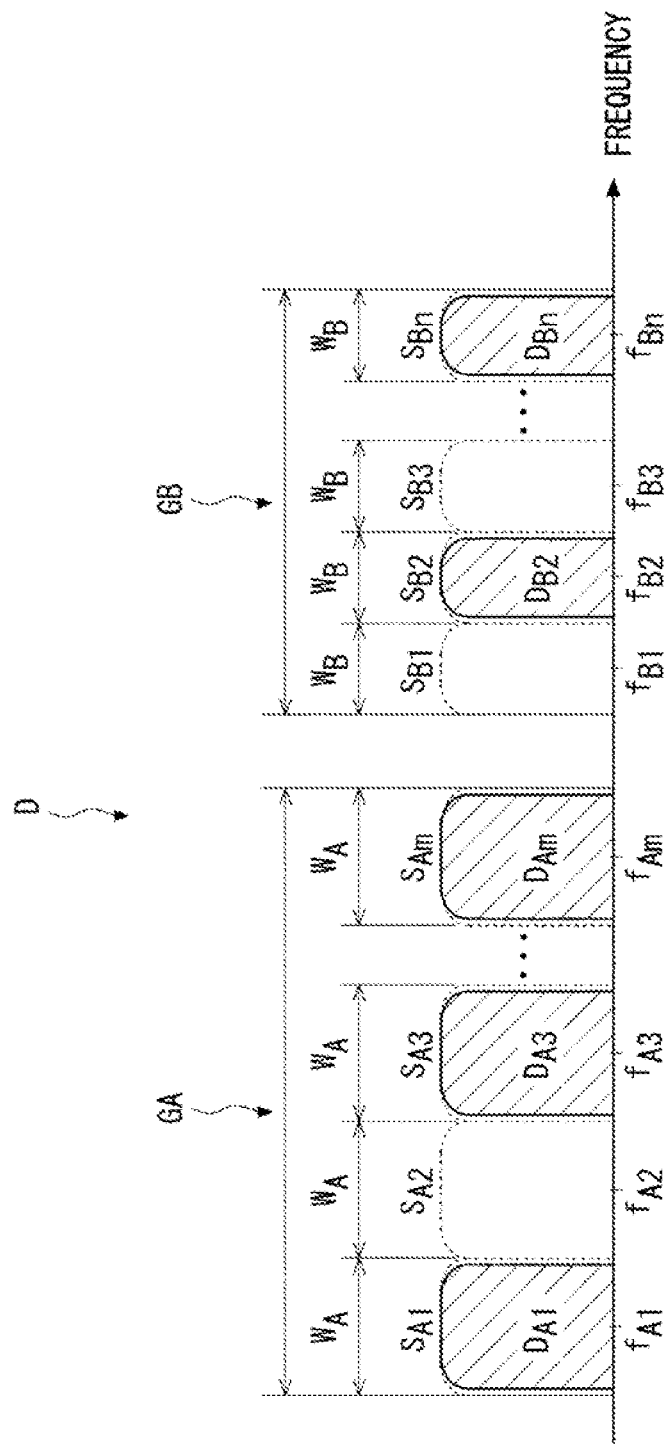
FIG. 10 is a diagram showing an arrangement of selected dummy lights.

FIG. 10 shows an arrangement of selected dummy lights. That is, FIG. 10 shows a frequency distribution of the dummy light D output from the frequency selection unit 22. As shown in FIG. 10, the center frequencies and bandwidths of the dummy lights provided in the band of the frequency grid GA are different from those of the dummy lights provided in the band of the frequency grid GB. The frequency selection unit 22 sets, in the light DL. center frequency intervals and bandwidths different between the band GA and the band GB as the frequency to be selectively output.

Step SA13

The frequency selection unit 22 outputs a frequency that does not overlap with the optical signal from the frequencies in the light DL that are set to be selectively output. For example, the frequency selection unit 22 identifies a frequency slot in which no optical signal is arranged, selects a center frequency corresponding to the identified frequency slot, and outputs the selected center frequency as a dummy light. Note that the frequency selection unit 22 may acquire information of the frequency slot in which no optical signal is arranged from the management server 1001. When the optical transmission apparatus 100 may include an optical monitor unit not shown in the drawings and the optical monitor unit monitors the frequency and intensity of the optical signal, the frequency slot in which no optical signal is arranged may be identified based on a monitoring result of the optical monitor unit.

Step SA14

The multiplexing unit 3 multiplexes the optical signal LC arranged as shown in FIG. 9 and the dummy light D arranged as shown in FIG. 10. Thus, the wavelength-multiplexed optical signal L shown in FIG. 4 is output from the multiplexing unit 3.

As described above, according to the present configuration, the optical signals and the dummy lights can be arranged in the frequency grid according to the setting of the frequency grid.

Figure 11:
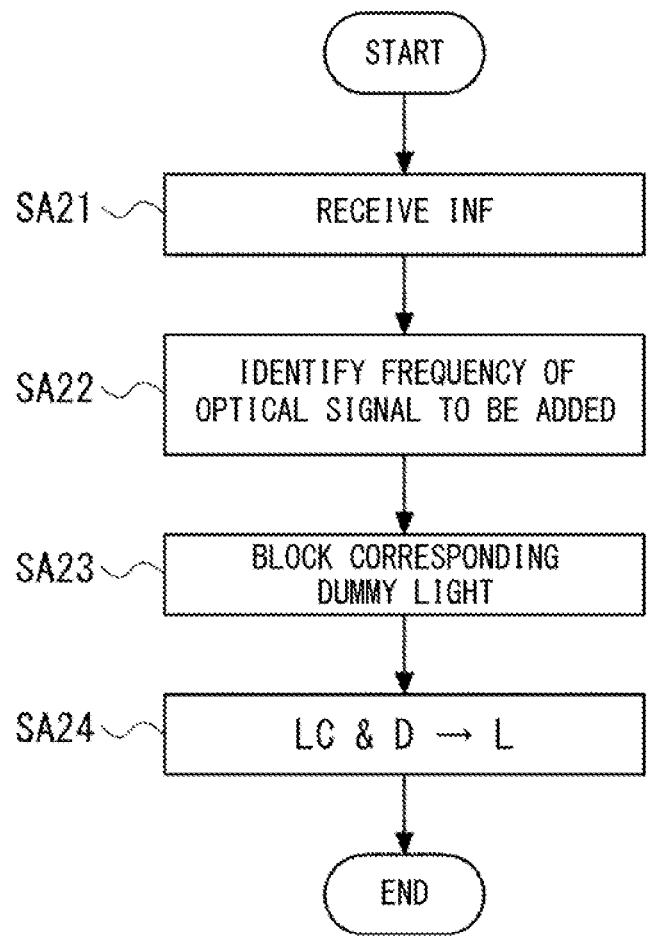
FIG. 11 is a flowchart showing the operation of the optical transmission apparatus according to the first example embodiment.

Next, an operation of the optical transmission apparatus 100 when a new optical signal is added to the wavelength-multiplexed optical signal L will be described. FIG. 11 is a flowchart showing the operation of the optical transmission apparatus 100 according to the first example embodiment. In this case, the additional optical signal may be output from the optical transceiver newly connected to the optical transmission apparatus 100, or may be additionally output from the optical transceiver already connected to the optical transmission apparatus 100.

To notify that the new optical signal is added, the management server 1001 outputs the notification signal INF to the optical transmission apparatus 100. At this time, the notification signal INF may include information indicating the center frequencies of all optical signals including the optical signal to be added, or may include information indicating only the center frequency of the optical signal to be added.

Step SA21

The frequency selection unit 22 receives the notification signal INF.

Step SA22

Figure 12:
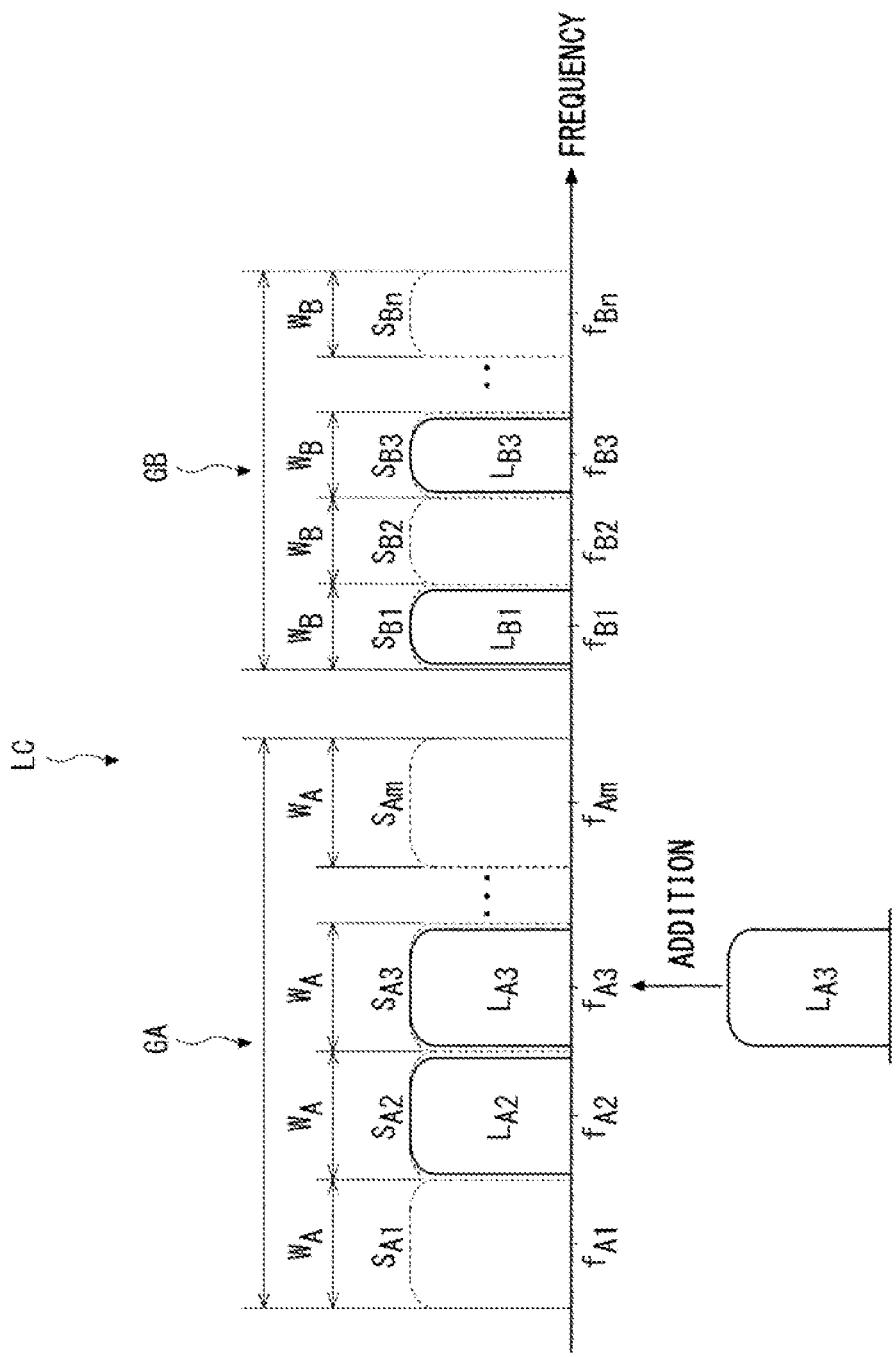
FIG. 12 is a diagram showing an optical signal to be added.

The frequency selection unit 22 refers to the table TAB1 stored based on the notification signal INF, and identifies a frequency slot corresponding to the center frequency of the optical signal to be added. FIG. 12 shows the optical signal to be added. FIG. 12 shows an example in which an optical signal $L_{A3}$ having the center frequency $f_{A3}$ is added to the frequency slot $S_{A3}$ of the frequency grid GA.

Step SA23

Figure 13:
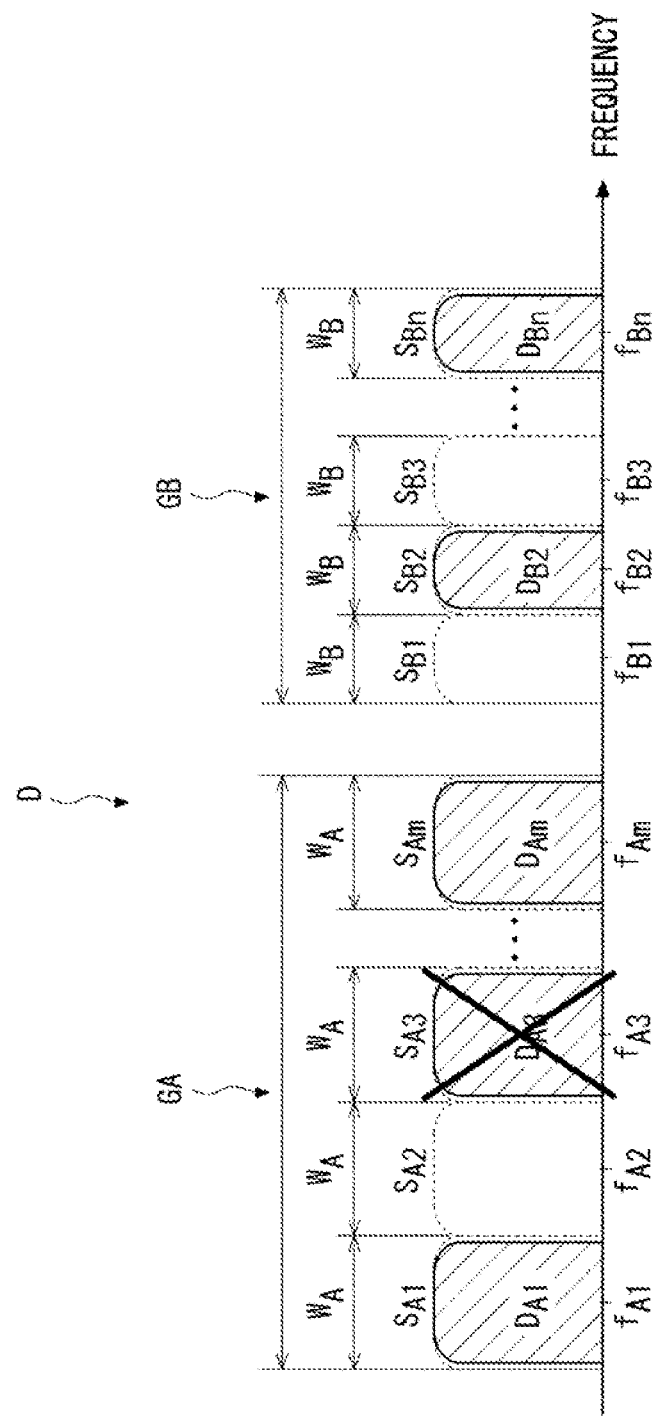
FIG. 13 is a diagram showing a dummy light to be blocked.

The frequency selection unit 22 blocks the dummy light $D_{A3}$ arranged in the frequency slot $S_{A3}$. FIG. 13 shows the dummy light $D_{A3}$ to be blocked.

Step SA24

Figure 14:
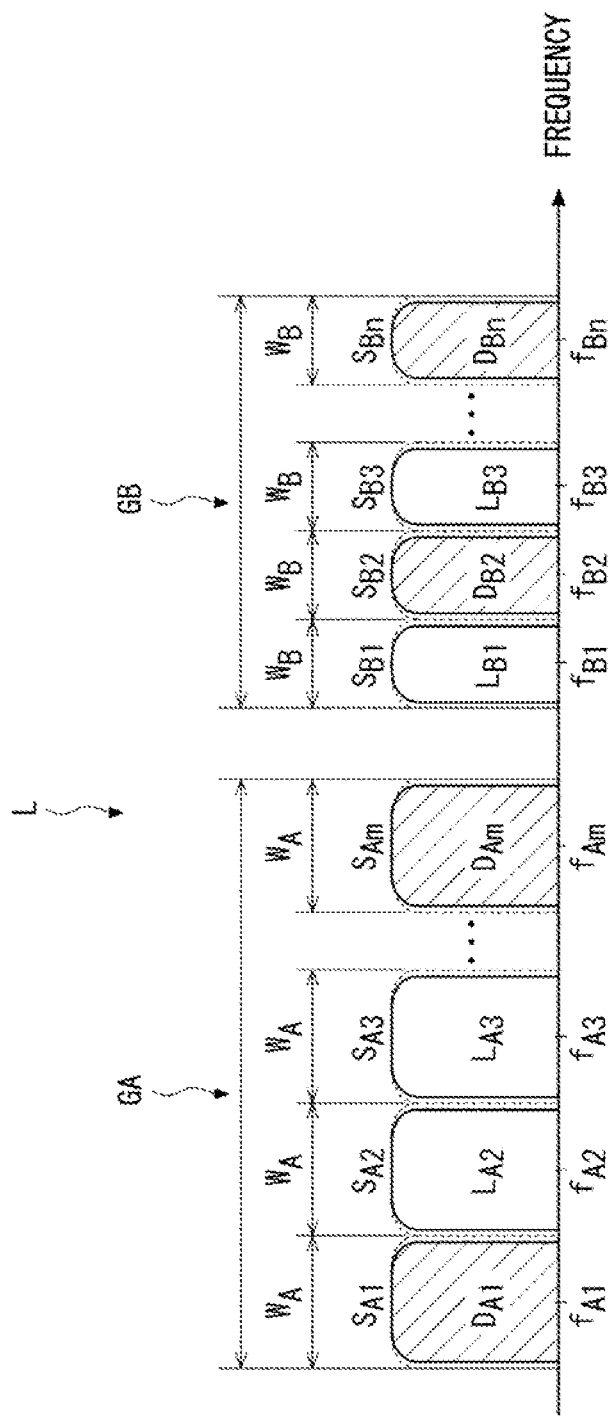
FIG. 14 is a diagram showing the wavelength-multiplexed optical signal after the optical signal has been added.

Thereafter, the optical signal $L_{A3}$ is output and the optical signal $L_{A3}$ is added to the wavelength-multiplexed optical signal L. FIG. 14 shows the wavelength-multiplexed optical signal L after the optical signal $L_{A3}$ has been added.

As described above, according to the present configuration, even when the new optical signal is added, the dummy light corresponding to the optical signal to be added can be blocked to prevent the added optical signal from overlapping with the dummy light. As a result, even after the optical transmission apparatus is installed at the terminal station and the operation thereof is started, an appropriate dummy light can be flexibly output according to a change of the optical signal to be transmitted.

Figure 15:
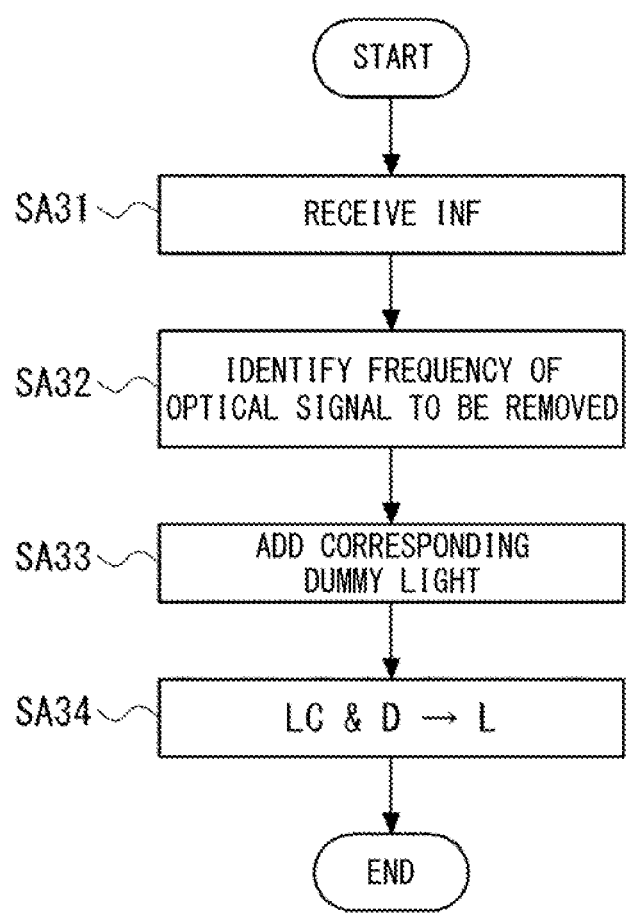
FIG. 15 is a flowchart showing the operation of the optical transmission apparatus according to the first example embodiment.

Next, an operation of the optical transmission apparatus 100 when an optical signal is removed from the wavelength-multiplexed optical signal L will be described. FIG. 15 is a flowchart showing the operation of the optical transmission apparatus 100 according to the first example embodiment. In this case, the optical signal to be removed may be an optical signal output from the optical transceiver removed from the optical transmission apparatus 100, or an optical signal to be blocked included in a plurality of optical signals having different center frequencies output from the optical transceiver connected to the optical transmission apparatus 100.

To notify that the optical signal is removed from the wavelength-multiplexed optical signal L, the management server 1001 outputs the notification signal INF to the optical transmission apparatus 100. At this time, the notification signal INF may include information indicating the center frequencies of the optical signals other than the optical signal to be removed, or may include information indicating only the center frequency of the optical signal to be removed.

Step SA31

The frequency selection unit 22 receives the notification signal INF.

Step SA32

Figure 16:
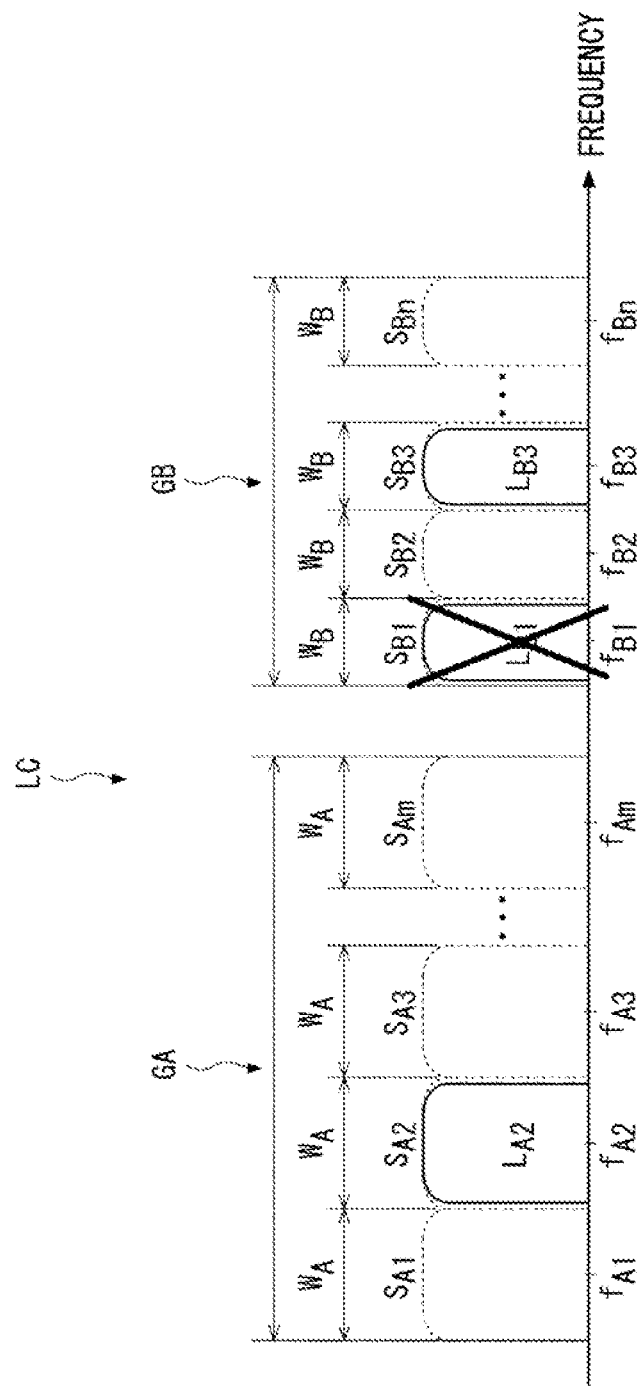
FIG. 16 is a diagram showing an optical signal to be removed.

The frequency selection unit 22 refers to the table TAB1 stored based on the notification signal INF, and identifies a slot in which the optical signal to be removed is arranged. FIG. 16 shows the optical signal to be removed. FIG. 16 shows an example in which the optical signal $L_{B1}$ arranged in the frequency slot $S_{B1}$ of the frequency grid GB is removed.

Step SA33

Figure 17:
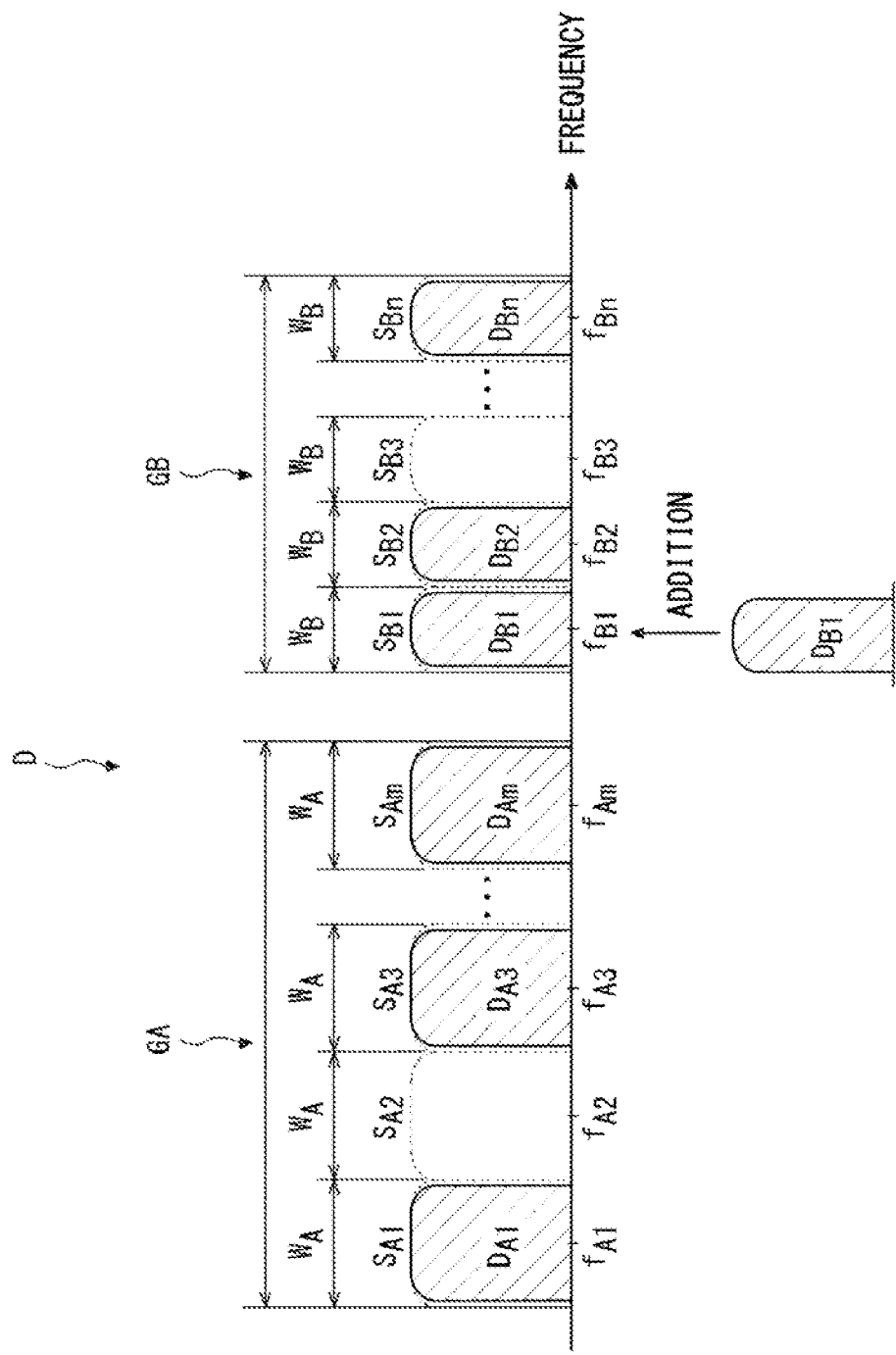
FIG. 17 is a diagram showing an additional dummy light.

After the optical signal $L_{B1}$ is blocked, the frequency selection unit 22 adds a dummy light $D_{B1}$ arranged in the frequency slot $S_{B1}$. FIG. 17 shows the added dummy light $D_{B1}$.

Step SA34

Figure 18:
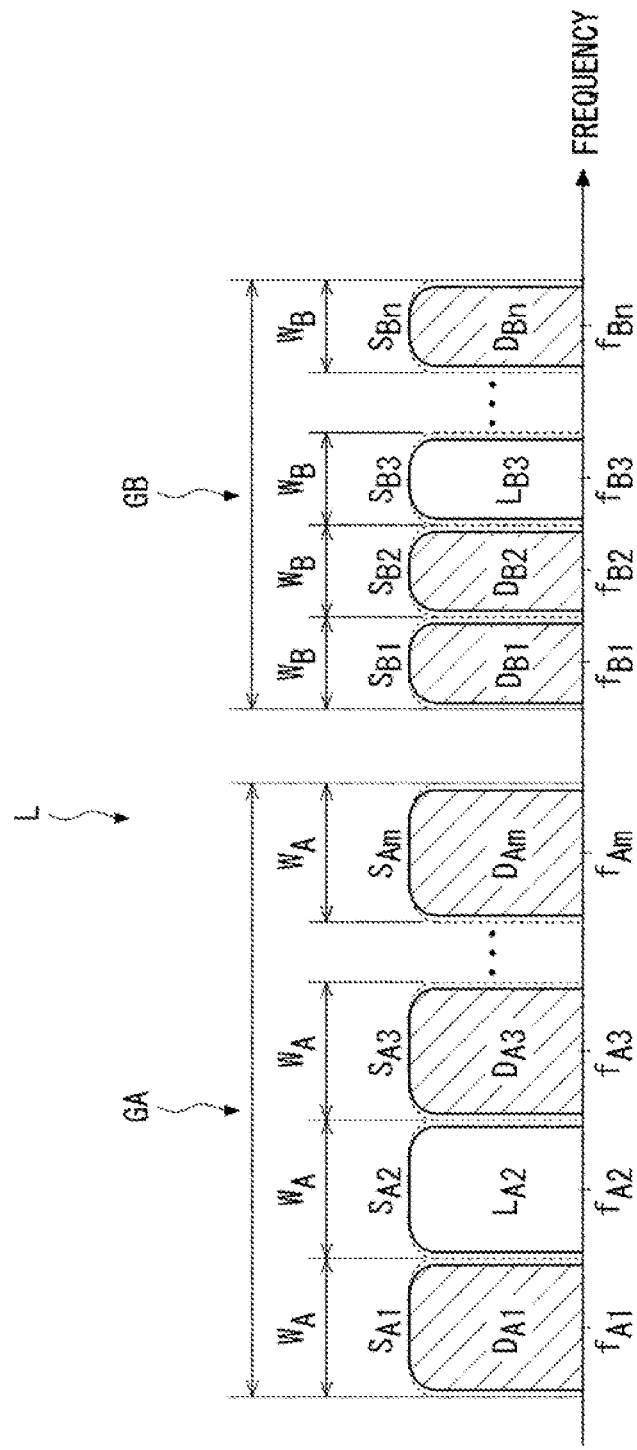
FIG. 18 is a diagram showing the wavelength-multiplexed optical signal after the optical signal has been removed.

Thus, the optical signal $L_{B1}$ is removed from the wavelength-multiplexed optical signal L, and the dummy light $D_{B1}$ corresponding to the vacant frequency slot $S_{B1}$ is added. FIG. 18 shows the wavelength-multiplexed optical signal L after the optical signal $L_{B1}$ has been removed.

As described above, according to the present configuration, even when the optical signal is removed from the wavelength-multiplexed optical signal, the output of the wavelength-multiplexed optical signal can be maintained by adding the dummy light corresponding to the removed optical signal. As a result, even after the optical transmission apparatus is installed at the terminal station and the operation thereof is started, the appropriate dummy light can be flexibly output in accordance with the change of the optical signal to be transmitted.

The number and width of the frequency grids described with reference to FIGS. 3 and 4 and the number and width of the frequency slots arranged in the frequency grid can be arbitrarily set. Therefore, for example, when the setting of the frequency grid or the frequency slot is changed, by performing the operation described in FIG. 8, the optical signal and the dummy light can be easily rearranged according to the changed frequency grid or frequency slot.

Second Example Embodiment

Figure 19:
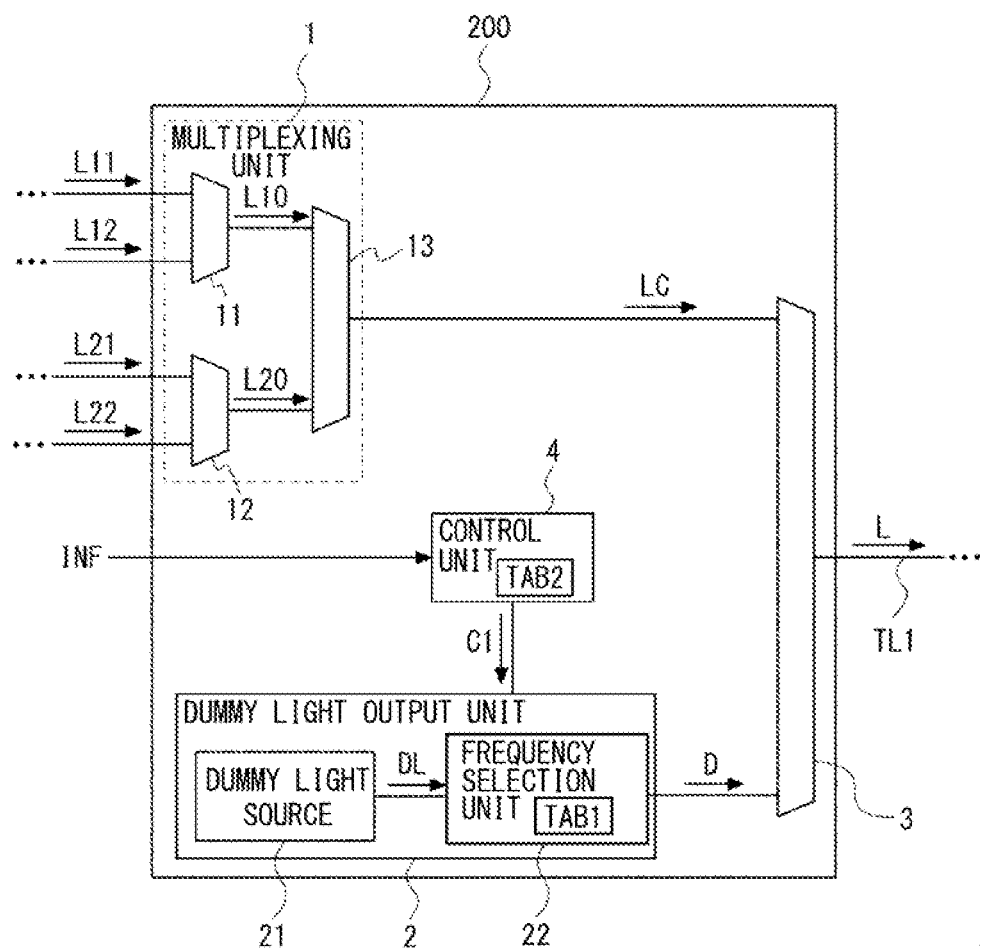
FIG. 19 is a diagram schematically showing a configuration of an optical transmission apparatus according to a second example embodiment.

An optical transmission apparatus 200 according to a second example embodiment will be described. FIG. 19 schematically shows a configuration of the optical transmission apparatus 200 according to the second example embodiment. The optical transmission apparatus 200 has a configuration in which a control unit 4 is added to the optical transmission apparatus 100 according to the first example embodiment.

The control unit 4 receives the notification signal INF from the management server 1001, and the frequency selection unit 22 outputs a control signal C1 in response to the notification signal INF to control the wavelength selection operation of the frequency selection unit 22.

In the present example embodiment, the notification signal INF output from the management server 1001 to the control unit 4 includes port information specifying a port of the WSS constituting the multiplexers 11 to 13 included in the multiplexing unit 1. The port information is information indicating a frequency transmitted through each port.

The control unit 4 stores a table TAB2 indicating a correspondence relationship between the ports of the WSS constituting the multiplexer 11 to 13 and an optical signal or a correspondence relationship between the ports of the WSS and the frequency slot. The control unit 4 refers to the table TAB2 according to the port information indicated by the notification signal INF, and identifies the center frequency of the optical signal corresponding to the given port information. Then, the control unit 4 notifies the frequency selection unit 22 of the center frequency of the optical signal by the control signal C1.

According to the present configuration, as in the case of the optical transmission apparatus 100 according to the first example embodiment, the optical signal and the dummy light can be arranged in the frequency grid according to the setting of the frequency grid. Further, it should be appreciated that, according to the present configuration, the optical signal can be added and removed in the same manner as the optical transmission apparatus 100 according to the first example embodiment.

In the present configuration, the control unit 4 may provide the multiplexing unit 1 with a control signal to adjust the respective intensities of the optical signals multiplexed by the multiplexing unit 1. In this case, when the new optical signal is added, the intensity of the added optical signal may be adjusted based on the intensity of the dummy light to be blocked.

Third Example Embodiment

Figure 20:
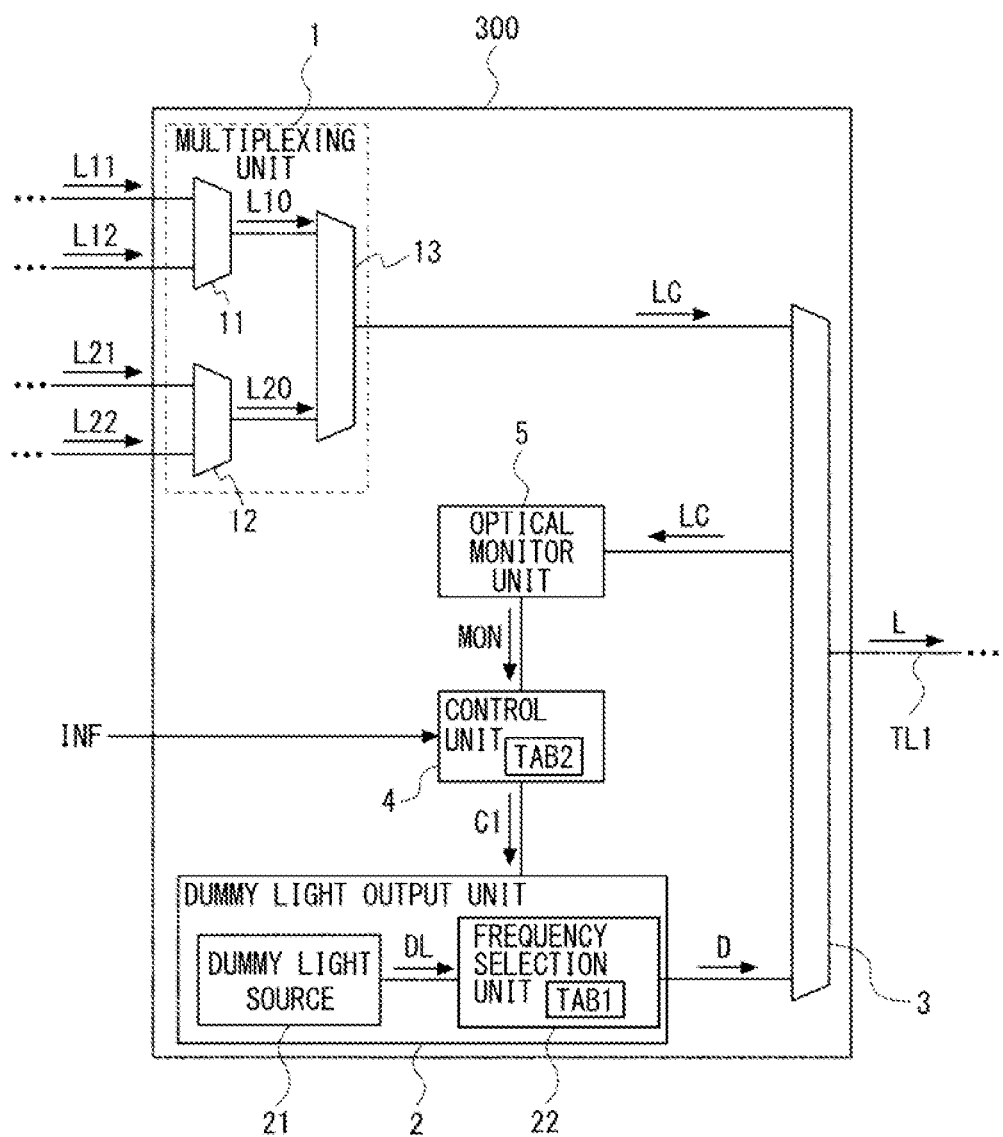
FIG. 20 is a diagram schematically showing a configuration of an optical transmission apparatus according to a third example embodiment.

An optical transmission apparatus 300 according to a third example embodiment will be described. FIG. 20 schematically shows a configuration of the optical transmission apparatus 300 according to the third example embodiment. The optical transmission apparatus 300 has a configuration in which an optical monitor unit 5 is added to the optical transmission apparatus 200 according to the second example embodiment.

In the present configuration, the multiplexing unit 3 branches a part of the input optical signal LC and outputs a part of the branched optical signal LC to the optical monitor unit 5.

Figure 21:
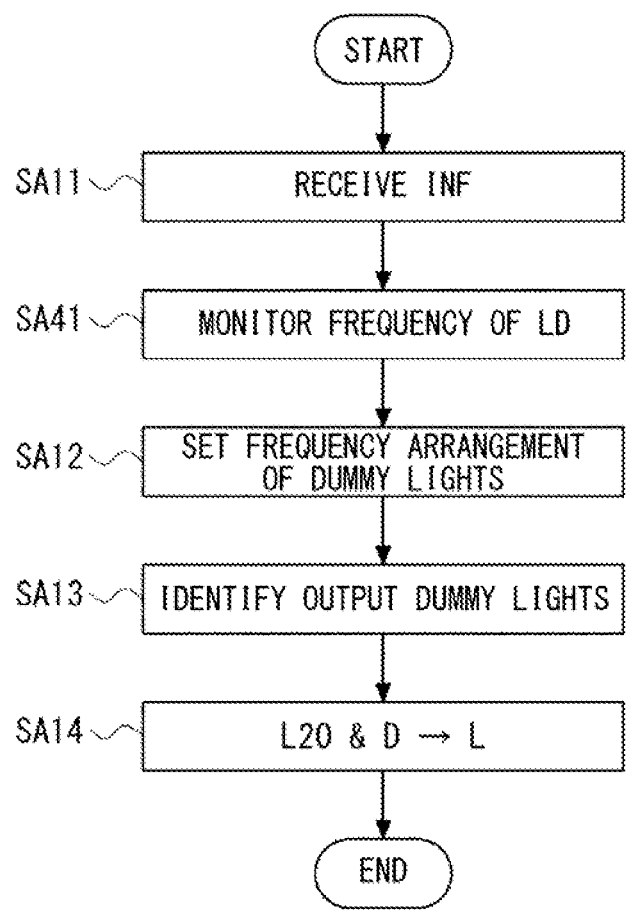
FIG. 21 is a flowchart showing an operation of the optical transmission apparatus according to the third example embodiment.

FIG. 21 is a flowchart showing an operation of the optical transmission apparatus 300 according to the third example embodiment. In FIG. 21, between the step SA11 and the step SA12 in FIG. 8, a step SA41 is added. The steps SA11 to SA14 are the same as in FIG. 8.

The optical monitor unit 5 detects the optical signal LC input by a light-receiving element such as a photodiode, and can monitor the frequencies and intensities of the optical signals included in the optical signal LC. The optical monitor unit 5 outputs a monitor signal MON indicating the monitor result of the optical signal LC to the control unit 4 (Step 41 in FIG. 21).

The control unit 4 can set the frequency arrangement of the dummy lights according to the center frequencies of the optical signals included in the optical signal LC with reference to the monitor signal MON (Step 12 in FIG. 21). The control unit 4 notifies the setting of the frequency arrangement of the dummy lights by the control signal C1.

Thereafter, in the same manner as in FIG. 8, the dummy lights corresponding to the arrangement of the optical signals can be output from the frequency selection unit 22 in the steps SA13 and SA14.

According to the present configuration, the center frequency of the optical signal can be autonomously identified without receiving the notification signal INF including the center frequencies of the optical signals and the port information of the multiplexing unit 1 from the management server 1001. Also in this case, a signal for identifying the center frequencies of the optical signals and instructing the start of the operation for outputting the dummy lights may be received from an external device such as the management server 1001, and the operation of the optical transmission apparatus 300 shown in FIG. 21 may be started in response to the received signal.

Other Example Embodiments

The present invention is not limited to the above-described example embodiments and can be modified as appropriate without departing from the spirit and scope of the present invention. For example, in the above-described example embodiments, for the sake of simplification of the description, although it has been described that one dummy light or one optical signal is arranged in one slot, it is merely an example. For example, as described with reference to FIG. 5, a plurality of channels may be set in one frequency slot, and an optical signal or a dummy light may be arranged in each channel. In this case, as in the case where one dummy light or one optical signal is arranged in one slot, the optical signal or the dummy light can be arranged based on the center frequency of the optical signal or the dummy light of each channel.

Although two frequency grids have been described in the above-described example embodiments, the wavelength-multiplexed optical signal may include three or more frequency grids.

The number of the optical transceivers connected to the optical transmission apparatus is merely an example, and it should be appreciated that any number of optical transceivers may be connected to the optical transmission apparatus.

In the above-described example embodiments, although it has been described that the management server is disposed separately from the terminal station, the management server may be disposed as a terminal station monitoring device disposed in the terminal station.

The operation of the optical transmission apparatus shown in FIG. 8 can be similarly performed even when no optical transceiver is connected to the optical transmission apparatus or even when the optical transceiver does not output the optical signal.

For example, the whole or part of the example embodiments disclosed above can be described as, but not limited to, the following supplementary notes.

(Supplementary Note 1) An optical transmission apparatus including: a first multiplexing unit, a plurality of optical signals of different frequencies arranged in a frequency grid being input to the first multiplexing unit, the first multiplexing unit being configured to multiplex the input optical signals; a dummy light output unit configured to identify one or more dummy lights to be arranged in the frequency grid based on the plurality of optical signals and output the identified one or more dummy lights; and a second multiplexing unit configured to multiplex the plurality of optical signals multiplexed by the first multiplexing unit and the one or more dummy lights output from the dummy light output unit to output a wavelength-multiplexed optical signal.

(Supplementary Note 2) The optical transmission apparatus according to Supplementary Note 1, in which a signal indicating frequencies of the plurality of optical signals is received, and frequencies of the one or more dummy lights are identified based on the received signal.

(Supplementary Note 3) The optical transmission apparatus according to Supplementary Note 1, further including a control unit configured to be capable of controlling the dummy light output unit, in which the control unit: receives information indicating ports disposed in the first multiplexing unit respectively corresponding to the plurality of optical signals; identifies frequencies of the plurality of optical signals based on the information indicating the ports; identifies frequencies of the one or more dummy lights based on the frequencies of the plurality of optical signals; and controls the dummy light output unit to output the one or more dummy lights of the identified frequencies.

(Supplementary Note 4) The optical transmission apparatus according to Supplementary Note 3, further including an optical monitor unit configured to monitor intensities of the plurality of optical signals multiplexed by the first multiplexing unit and output a signal indicating a monitoring result to the control unit, in which the control unit: identifies the frequencies of the plurality of optical signals multiplexed by the first multiplexing unit based on the signal indicating the monitor result; identifies the frequencies of the one or more dummy lights based on the frequencies of the plurality of optical signals; and controls the dummy light output unit to output the one or more dummy lights of the identified frequencies.

(Supplementary Note 5) The optical transmission apparatus according to any one of Supplementary Notes 1 to 4, in which, when an optical signal of a frequency different from those of the plurality of optical signals is additionally input to the first multiplexing unit, the dummy light output unit identifies a dummy light corresponding to the frequency of the optical signal to be added from the one or more dummy lights, and stops outputting the identified dummy light.

(Supplementary Note 6) The optical transmission apparatus according to any one of Supplementary Notes 1 to 5, in which, when there is an optical signal that is blocked not to be input to the first multiplexing unit in the plurality of the optical signals input to the first multiplexing unit, the dummy light output unit identifies a dummy light corresponding to a frequency of the optical signal to be blocked, and newly outputs the identified dummy light.

(Supplementary Note 7) The optical transmission apparatus according to any one of Supplementary Notes 1 to 6, in which a plurality of frequency slots having a predetermined width are arranged in the frequency grid, and in each of the plurality of frequency slots, one optical signal or one dummy light are arranged, or one or more optical signals and one or more dummy lights are arranged without overlapping.

(Supplementary Note 8) A terminal station apparatus including: one or more optical transceivers; and an optical transmission apparatus in which a plurality of optical signals of different wavelengths are input from the one or more optical transceivers, in which the optical transmission apparatus includes: a first multiplexing unit, a plurality of optical signals of different frequencies arranged in a frequency grid being input to the first multiplexing unit, the first multiplexing unit being configured to multiplex the input optical signals; a dummy light output unit configured to identify one or more dummy lights to be arranged in the frequency grid based on the plurality of optical signals and output the identified one or more dummy lights; and a second multiplexing unit configured to multiplex the plurality of optical signals multiplexed by the first multiplexing unit and the one or more dummy lights output from the dummy light output unit to output a wavelength-multiplexed optical signal.

(Supplementary Note 9) The terminal station apparatus according to Supplementary Note 8, in which a signal indicating frequencies of the plurality of optical signals is received, and frequencies of the one or more dummy lights are identified based on the received signal.

(Supplementary Note 10) The terminal station apparatus according to Supplementary Note 8, further including a control unit configured to be capable of controlling the dummy light output unit, in which the control unit: receives information indicating ports disposed in the first multiplexing unit respectively corresponding to the plurality of optical signals; identifies frequencies of the plurality of optical signals based on the information indicating the ports; identifies frequencies of the one or more dummy lights based on the frequencies of the plurality of optical signals; and controls the dummy light output unit to output the one or more dummy lights of the identified frequencies.

(Supplementary Note 11) The terminal station apparatus according to Supplementary Note 10, further including an optical monitor unit configured to monitor intensities of the plurality of optical signals multiplexed by the first multiplexing unit and output a signal indicating a monitoring result to the control unit, in which the control unit: identifies the frequencies of the plurality of optical signals multiplexed by the first multiplexing unit based on the signal indicating the monitor result; identifies the frequencies of the one or more dummy lights based on the frequencies of the plurality of optical signals; and controls the dummy light output unit to output the one or more dummy lights of the identified frequencies.

(Supplementary Note 12) The terminal station apparatus according to any one of Supplementary Notes 8 to 11, in which, when an optical signal of a frequency different from those of the plurality of optical signals is additionally input to the first multiplexing unit, the dummy light output unit identifies a dummy light corresponding to the frequency of the optical signal to be added from the one or more dummy lights, and stops outputting the identified dummy light.

(Supplementary Note 13) The terminal station apparatus according to any one of Supplementary Notes 8 to 12, in which, when there is an optical signal that is blocked not to be input to the first multiplexing unit in the plurality of the optical signals input to the first multiplexing unit, the dummy light output unit identifies a dummy light corresponding to a frequency of the optical signal to be blocked, and newly outputs the identified dummy light.

(Supplementary Note 14) The terminal station apparatus according to any one of Supplementary Notes 8 to 13, in which a plurality of frequency slots having a predetermined width are arranged in the frequency grid, and in each of the plurality of frequency slots, one optical signal or one dummy light are arranged, or one or more optical signals and one or more dummy lights are arranged without overlapping.

(Supplementary Note 15) An optical communication system including: a first terminal station configured to output a wavelength-multiplexed optical signal; and a second terminal station configured to receive the wavelength-multiplexed optical signal, in which the first terminal station includes: one or more optical transceivers; and an optical transmission apparatus in which a plurality of optical signals of different wavelengths are input from the one or more optical transceivers, in which the optical transmission apparatus includes: a first multiplexing unit, a plurality of optical signals of different frequencies arranged in a frequency grid being input to the first multiplexing unit, the first multiplexing unit being configured to multiplex the input optical signals; a dummy light output unit configured to identify one or more dummy lights to be arranged in the frequency grid based on the plurality of optical signals and output the identified one or more dummy lights; and a second multiplexing unit configured to multiplex the plurality of optical signals multiplexed by the first multiplexing unit and the one or more dummy lights output from the dummy light output unit to output a wavelength-multiplexed optical signal.

(Supplementary Note 16) The optical communication system according to Supplementary Note 15, in which a signal indicating frequencies of the plurality of optical signals is received, and frequencies of the one or more dummy lights are identified based on the received signal.

(Supplementary Note 17) The optical communication system according to Supplementary Note 15, further including a control unit configured to be capable of controlling the dummy light output unit, in which the control unit: receives information indicating ports disposed in the first multiplexing unit respectively corresponding to the plurality of optical signals; identifies frequencies of the plurality of optical signals based on the information indicating the ports; identifies frequencies of the one or more dummy lights based on the frequencies of the plurality of optical signals; and controls the dummy light output unit to output the one or more dummy lights of the identified frequencies.

(Supplementary Note 18) The optical communication system according to Supplementary Note 17, further including an optical monitor unit configured to monitor intensities of the plurality of optical signals multiplexed by the first multiplexing unit and output a signal indicating a monitoring result to the control unit, in which the control unit: identifies the frequencies of the plurality of optical signals multiplexed by the first multiplexing unit based on the signal indicating the monitor result; identifies the frequencies of the one or more dummy lights based on the frequencies of the plurality of optical signals; and controls the dummy light output unit to output the one or more dummy lights of the identified frequencies.

(Supplementary Note 19) The optical communication system according to any one of Supplementary Notes 15 to 18, in which, when an optical signal of a frequency different from those of the plurality of optical signals is additionally input to the first multiplexing unit, the dummy light output unit identifies a dummy light corresponding to the frequency of the optical signal to be added from the one or more dummy lights, and stops outputting the identified dummy light.

(Supplementary Note 20) The optical communication system according to any one of Supplementary Notes 15 to 19, in which, when there is an optical signal that is blocked not to be input to the first multiplexing unit in the plurality of the optical signals input to the first multiplexing unit, the dummy light output unit identifies a dummy light corresponding to a frequency of the optical signal to be blocked, and newly outputs the identified dummy light.

(Supplementary Note 21) The optical communication system according to any one of Supplementary Notes 15 to 20, in which a plurality of frequency slots having a predetermined width are arranged in the frequency grid, and in each of the plurality of frequency slots, one optical signal or one dummy light are arranged, or one or more optical signals and one or more dummy lights are arranged without overlapping.

(Supplementary Note 22) An optical communication method including: multiplexing a plurality of optical signals of different frequencies arranged in a frequency grid; identifying one or more dummy lights to be arranged in the frequency grid based on the plurality of optical signals and outputting the one or more identified dummy lights; and multiplexing the plurality of multiplexed optical signals and the one or more dummy lights to output a wavelength-multiplexed optical signal.

(Supplementary Note 23) The optical communication method according to Supplementary Note 22, in which a signal indicating frequencies of the plurality of optical signals is received, and frequencies of the one or more dummy lights are identified based on the received signal.

(Supplementary Note 24) The optical communication method according to Supplementary Note 22, in which the plurality of optical signals are multiplexed by a multiplexing unit, information indicating ports disposed in the multiplexing unit respectively corresponding to the plurality of optical signals is received, frequencies of the plurality of optical signals are identified based on the information indicating the ports; frequencies of the one or more dummy lights are identified based on the frequencies of the plurality of optical signals, and the one or more dummy lights of the identified frequencies are output.

(Supplementary Note 25) The optical communication method according to Supplementary Note 24, in which intensities of the plurality of multiplexed optical signals are monitored to output a signal indicating a monitoring result, the frequencies of the plurality of multiplexed optical signals are identified based on the signal indicating the monitor result, the frequencies of the one or more dummy lights are identified based on the frequencies of the plurality of optical signals, and the one or more dummy lights of the identified frequencies are output.

(Supplementary Note 26) The optical communication method according to any one of Supplementary Notes 22 to 25, in which, when an optical signal of a frequency different from that of the plurality of optical signals is added, a dummy light corresponding to the frequency of the frequency of the optical signal to be added is identified from the one or more dummy lights, and the output of the identified dummy light is stopped.

(Supplementary Note 27) The optical communication method according to any one of Supplementary Notes 22 to 26, in which, when there is an optical signal to be blocked in the plurality of optical signals, a dummy light corresponding to a frequency of the optical signal to be blocked is identified, and the identified dummy light is newly output.

(Supplementary Note 28) The optical communication method according to any one of Supplementary Notes 22 to 27, in which a plurality of frequency slots having a predetermined width are arranged in the frequency grid, and in each of the plurality of frequency slots, one optical signal or one dummy light are arranged, or one or more optical signals and one or more dummy lights are arranged without overlapping.

While the present invention has been particularly shown and described with reference to example embodiments thereof, the present invention is not limited to these example embodiments. It will be understood by those of ordinary skill in the art that various changes in form and details may be made therein without departing from the spirit and scope of the present invention.

This application is based upon and claims the benefit of priority from Japanese patent application No. 2019-16416 filed on Jan. 31, 2019, the disclosure of which is incorporated herein in its entirety by reference.

REFERENCE SIGNS LIST 1, 3 MULTIPLEXING UNITS
2 DUMMY LIGHT OUTPUT UNIT
4 CONTROL UNIT
5 OPTICAL MONITOR UNIT
11 TO 13 MULTIPLEXERS
21 DUMMY LIGHT SOURCE
22 FREQUENCY SELECTION UNIT
100, 200, 300 OPTICAL TRANSMISSION APPARATUSES
1000 OPTICAL COMMUNICATION SYSTEMS
1001 MANAGEMENT SERVER
AMP OPTICAL AMPLIFIER
C1 CONTROL SIGNAL
D DUMMY LIGHT
DL LIGHT
F OPTICAL FIBER
G1, G2, GA, GB FREQUENCY GRIDS
INF NOTIFICATION SIGNAL
L, LL WAVELENGTH-MULTIPLEXED OPTICAL SIGNALS
L10 TO L12, L20 TO L22, LC OPTICAL SIGNALS
MON MONITOR SIGNAL
TA TERMINAL APPARATUS
TAB1, TAB2 TABLES
TL1, TL2 TRANSMISSION LINES
TPD11, TPD12, TPD21, TPD22 OPTICAL TRANSCEIVERS
TS1, TS2 TERMINAL STATIONS

What is claimed is:

1. An optical transmission apparatus comprising:
a first multiplexing unit, a plurality of optical signals of different frequencies arranged in a frequency grid being input to the first multiplexing unit, the first multiplexing unit being configured to multiplex the input optical signals;
a dummy light output unit configured to identify one or more dummy lights to be arranged in the frequency grid based on the plurality of optical signals and output the identified one or more dummy lights;
a second multiplexing unit configured to multiplex the plurality of optical signals multiplexed by the first multiplexing unit and the one or more dummy lights output from the dummy light output unit to output a wavelength-multiplexed optical signal; and
a control unit configured to be capable of controlling the dummy light output unit, wherein
the control unit:
receives information indicating ports disposed in the first multiplexing unit respectively corresponding to the plurality of optical signals;
identifies frequencies of the plurality of optical signals based on the information indicating the ports;
identifies frequencies of the one or more dummy lights based on the frequencies of the plurality of optical signals; and
controls the dummy light output unit to output the one or more dummy lights of the identified frequencies.

2. The optical transmission apparatus according to claim 1, wherein
a signal indicating frequencies of the plurality of optical signals is received, and
frequencies of the one or more dummy lights are identified based on the received signal.

3. The optical transmission apparatus according to claim 1, further comprising an optical monitor unit configured to monitor intensities of the plurality of optical signals multiplexed by the first multiplexing unit and output a signal indicating a monitoring result to the control unit, wherein
the control unit:
identifies the frequencies of the plurality of optical signals multiplexed by the first multiplexing unit based on the signal indicating the monitor result;
identifies the frequencies of the one or more dummy lights based on the frequencies of the plurality of optical signals; and
controls the dummy light output unit to output the one or more dummy lights of the identified frequencies.

4. The optical transmission apparatus according to claim 1, wherein, when an optical signal of a frequency different from those of the plurality of optical signals is additionally input to the first multiplexing unit, the dummy light output unit identifies a dummy light corresponding to the frequency of the optical signal to be added from the one or more dummy lights, and stops outputting the identified dummy light.

5. The optical transmission apparatus according to claim 1, wherein, when there is an optical signal that is blocked not to be input to the first multiplexing unit in the plurality of the optical signals input to the first multiplexing unit, the dummy light output unit identifies a dummy light corresponding to a frequency of the optical signal to be blocked, and newly outputs the identified dummy light.

6. The optical transmission apparatus according to claim 1, wherein
a plurality of frequency slots having a predetermined width are arranged in the frequency grid, and
in each of the plurality of frequency slots, one optical signal or one dummy light are arranged, or one or more optical signals and one or more dummy lights are arranged without overlapping.

7. A terminal station apparatus comprising:
one or more optical transceivers; and an optical transmission apparatus in which a plurality of optical signals of different wavelengths are input from the one or more optical transceivers, wherein the optical transmission apparatus comprises:

a first multiplexing unit, a plurality of optical signals of different frequencies arranged in a frequency grid being input to the first multiplexing unit, the first multiplexing unit being configured to multiplex the input optical signals;

a dummy light output unit configured to identify one or more dummy lights to be arranged in the frequency grid based on the plurality of optical signals and output the identified one or more dummy lights;

a second multiplexing unit configured to multiplex the plurality of optical signals multiplexed by the first multiplexing unit and the one or more dummy lights output from the dummy light output unit to output a wavelength-multiplexed optical signal; and a control unit configured to be capable of controlling the dummy light output unit, wherein the control unit:

receives information indicating ports disposed in the first multiplexing unit respectively corresponding to the plurality of optical signals;

identifies frequencies of the plurality of optical signals based on the information indicating the ports;

identifies frequencies of the one or more dummy lights based on the frequencies of the plurality of optical signals; and controls the dummy light output unit to output the one or more dummy lights of the identified frequencies.

8. The terminal station apparatus according to claim 7, wherein a signal indicating frequencies of the plurality of optical signals is received, and frequencies of the one or more dummy lights are identified based on the received signal.

9. The terminal station apparatus according to claim 7, further comprising an optical monitor unit configured to monitor intensities of the plurality of optical signals multiplexed by the first multiplexing unit and output a signal indicating a monitoring result to the control unit, wherein the control unit:

identifies the frequencies of the plurality of optical signals multiplexed by the first multiplexing unit based on the signal indicating the monitor result;

identifies the frequencies of the one or more dummy lights based on the frequencies of the plurality of optical signals; and controls the dummy light output unit to output the one or more dummy lights of the identified frequencies.

10. The terminal station apparatus according to claim 7, wherein, when an optical signal of a frequency different from those of the plurality of optical signals is additionally input to the first multiplexing unit, the dummy light output unit identifies a dummy light corresponding to the frequency of the optical signal to be added from the one or more dummy lights, and stops outputting the identified dummy light.

11. The terminal station apparatus according to claim 7, wherein, when there is an optical signal that is blocked not to be input to the first multiplexing unit in the plurality of the optical signals input to the first multiplexing unit, the dummy light output unit identifies a dummy light corresponding to a frequency of the optical signal to be blocked, and newly outputs the identified dummy light.

12. The terminal station apparatus according to claim 7, wherein a plurality of frequency slots having a predetermined width are arranged in the frequency grid, and in each of the plurality of frequency slots, one optical signal or one dummy light are arranged, or one or more optical signals and one or more dummy lights are arranged without overlapping.

13. An optical communication system comprising:

a first terminal station configured to output a wavelength-multiplexed optical signal; and a second terminal station configured to receive the wavelength-multiplexed optical signal, wherein the first terminal station comprises:

one or more optical transceivers; and an optical transmission apparatus in which a plurality of optical signals of different wavelengths are input from the one or more optical transceivers, wherein the optical transmission apparatus comprises:

a first multiplexing unit, a plurality of optical signals of different frequencies arranged in a frequency grid being input to the first multiplexing unit, the first multiplexing unit being configured to multiplex the input optical signals;

a dummy light output unit configured to identify one or more dummy lights to be arranged in the frequency grid based on the plurality of optical signals and output the identified one or more dummy lights;

a second multiplexing unit configured to multiplex the plurality of optical signals multiplexed by the first multiplexing unit and the one or more dummy lights output from the dummy light output unit to output a wavelength-multiplexed optical signal; and a control unit configured to be capable of controlling the dummy light output unit, wherein the control unit:

receives information indicating ports disposed in the first multiplexing unit respectively corresponding to the plurality of optical signals;

identifies frequencies of the plurality of optical signals based on the information indicating the ports;

identifies frequencies of the one or more dummy lights based on the frequencies of the plurality of optical signals; and controls the dummy light output unit to output the one or more dummy lights of the identified frequencies.

14. The optical communication system according to claim 13, wherein a signal indicating frequencies of the plurality of optical signals is received, and frequencies of the one or more dummy lights are identified based on the received signal.

15. The optical communication system according to claim 13, further comprising an optical monitor unit configured to monitor intensities of the plurality of optical signals multiplexed by the first multiplexing unit and output a signal indicating a monitoring result to the control unit, wherein the control unit:

identifies the frequencies of the plurality of optical signals multiplexed by the first multiplexing unit based on the signal indicating the monitor result;

identifies the frequencies of the one or more dummy lights based on the frequencies of the plurality of optical signals; and controls the dummy light output unit to output the one or more dummy lights of the identified frequencies.

16. The optical communication system according to claim 13, wherein, when an optical signal of a frequency different from those of the plurality of optical signals is additionally input to the first multiplexing unit, the dummy light output unit identifies a dummy light corresponding to the frequency of the optical signal to be added from the one or more dummy lights, and stops outputting the identified dummy light.

17. The optical communication system according to claim 13, wherein, when there is an optical signal that is blocked not to be input to the first multiplexing unit in the plurality of the optical signals input to the first multiplexing unit, the dummy light output unit identifies a dummy light corresponding to a frequency of the optical signal to be blocked, and newly outputs the identified dummy light.

* * * * *